(12) United States Patent
Forsberg et al.

(10) Patent No.: US 11,474,533 B2
(45) Date of Patent: Oct. 18, 2022

(54) METHOD OF DETECTING A DIFFERENCE IN LEVEL OF A SURFACE IN FRONT OF A ROBOTIC CLEANING DEVICE

(71) Applicant: Aktiebolaget Electrolux, Stockholm (SE)

(72) Inventors: Petter Forsberg, Stockholm (SE); Magnus Lindhé, Stockholm (SE); Andreas Klintemyr, Stockholm (SE)

(73) Assignee: Aktiebolaget Electrolux

( * ) Notice: Subject to any disclaimer, the term of this patent is extended or adjusted under 35 U.S.C. 154(b) by 338 days.

(21) Appl. No.: 16/612,913

(22) PCT Filed: Jun. 2, 2017

(86) PCT No.: PCT/EP2017/063468
§ 371 (c)(1),
(2) Date: Nov. 12, 2019

(87) PCT Pub. No.: WO2018/219473
PCT Pub. Date: Dec. 6, 2018

(65) Prior Publication Data
US 2020/0081451 A1    Mar. 12, 2020

(51) Int. Cl.
*G05D 1/02* (2020.01)
*A47L 9/28* (2006.01)
*G06T 7/55* (2017.01)

(52) U.S. Cl.
CPC .......... *G05D 1/0246* (2013.01); *A47L 9/2826* (2013.01); *A47L 2201/04* (2013.01);
(Continued)

(58) Field of Classification Search
CPC .... A47L 11/4011; A47L 9/009; A47L 9/2826; A47L 9/5852; A47L 11/4061;
(Continued)

(56) References Cited

U.S. PATENT DOCUMENTS

| | | | |
|---|---|---|---|
| 1,286,321 | A | 12/1918 | Hoover |
| 1,401,007 | A | 12/1921 | Staples |

(Continued)

FOREIGN PATENT DOCUMENTS

| | | |
|---|---|---|
| CA | 2154758 | 6/1995 |
| CN | 1116818 | 2/1996 |

(Continued)

OTHER PUBLICATIONS

Notice of Reasons for Refusal for Japanese Application No. 2018-537617, dated Feb. 28, 2020, 3 pages.

(Continued)

*Primary Examiner* — Bhavesh V Amin
(74) *Attorney, Agent, or Firm* — RatnerPrestia

(57) ABSTRACT

A method for a robotic cleaning device of detecting a difference in level of a surface in front of the robotic cleaning device moves. The method includes illuminating the surface with light, capturing an image of the surface, detecting a luminous section in the captured image caused by the light, identifying at least a first segment and a second segment representing the detected luminous section, and detecting, from a positional relationship between the identified first and second segment, the difference in level of the surface.

13 Claims, 10 Drawing Sheets

(52) U.S. Cl.
CPC .............. *G05D 2201/0203* (2013.01); *G05D 2201/0215* (2013.01); *G06T 7/55* (2017.01)

(58) Field of Classification Search
CPC .............. A47L 11/4066; A47L 2201/04; A47L 9/2805; A47L 9/2894; A47L 9/2857; A47L 2201/06; G05D 1/0088; G05D 1/0225; G05D 2201/0203; G05D 1/0274; B25J 9/161; B25J 9/1679; B25J 11/0085; B25J 13/003; G06N 20/00
See application file for complete search history.

(56) References Cited

U.S. PATENT DOCUMENTS

| | | |
|---|---|---|
| 1,823,128 A | 9/1931 | Scott |
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,777,416 A | 10/1988 | George, II |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,918,607 A | 4/1990 | Wible |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | FereydounMaali |
| 5,353,224 A | 10/1994 | Lee |
| 5,367,458 A | 11/1994 | Roberts |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,893 A | 8/1995 | Hwang |
| 5,444,965 A | 8/1995 | Colens |
| 5,446,356 A | 8/1995 | Kim |
| 5,454,129 A | 10/1995 | Kell |
| 5,464,494 A | 11/1995 | Gerd |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,634,237 A | 6/1997 | Paranjpe |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,825,981 A | 10/1998 | Matsuda |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | YuichiKawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 5,999,865 A | 12/1999 | Bloomquist |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,240,342 B1 | 5/2001 | Fiegert |
| 6,251,551 B1 | 6/2001 | Kunze-Concewitz |
| 6,255,793 B1 | 7/2001 | Peless |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,374,157 B1 | 4/2002 | Takamura |
| 6,381,801 B1 | 5/2002 | Clemons, Sr. |
| 6,389,329 B1 | 5/2002 | Colens |
| 6,413,149 B1 | 7/2002 | Wada |

(56) References Cited

U.S. PATENT DOCUMENTS

| | | |
|---|---|---|
| 6,417,641 B2 | 7/2002 | Peless |
| 6,431,296 B1 | 8/2002 | Won |
| 6,438,456 B1 | 8/2002 | Feddema |
| 6,443,509 B1 | 9/2002 | Levin |
| 6,457,199 B1 | 10/2002 | Frost |
| 6,457,206 B1 | 10/2002 | Judson |
| 6,459,955 B1 | 10/2002 | Bartsch |
| 6,465,982 B1 | 10/2002 | Bergvall |
| 6,481,515 B1 | 11/2002 | Kirkpatrick |
| 6,482,678 B1 | 11/2002 | Frost |
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |
| 6,519,804 B1 | 2/2003 | Vujik |
| 6,525,509 B1 | 2/2003 | Petersson |
| D471,243 S | 3/2003 | Cioffi |
| 6,532,404 B2 | 3/2003 | Colens |
| 6,535,793 B2 | 3/2003 | Allard |
| 6,571,415 B2 | 6/2003 | Gerber |
| 6,580,246 B2 | 6/2003 | Jacobs |
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 | 2/2004 | Jones |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mori |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 6,984,952 B2 | 1/2006 | Peless |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,050,926 B2 | 5/2006 | Theurer |
| 7,053,578 B2 | 5/2006 | Diehl |
| 7,053,580 B2 | 5/2006 | Aldred |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,134,164 B2 | 11/2006 | Alton |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goncalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Hulden |
| 7,207,081 B2 | 4/2007 | Gerber |
| 7,208,892 B2 | 4/2007 | Tondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,246,405 B2 | 7/2007 | Yan |
| 7,248,951 B2 | 7/2007 | Hulden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Im |
| 7,274,167 B2 | 9/2007 | Kim |
| 7,275,280 B2 | 10/2007 | Haegermarck |
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |

(56) References Cited

U.S. PATENT DOCUMENTS

| | | |
|---|---|---|
| 7,388,343 B2 | 6/2008 | Jones |
| 7,389,156 B2 | 6/2008 | Ziegler |
| 7,389,166 B2 | 6/2008 | Harwig |
| 7,402,974 B2 | 7/2008 | Jeon |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |
| 7,430,455 B2 | 9/2008 | Casey |
| 7,438,766 B2 | 10/2008 | Song |
| 7,441,298 B2 | 10/2008 | Svendsen |
| 7,444,206 B2 | 10/2008 | Abramson |
| 7,448,113 B2 | 11/2008 | Jones |
| 7,459,871 B2 | 12/2008 | Landry |
| 7,464,157 B2 | 12/2008 | Okude |
| 7,474,941 B2 | 1/2009 | Kim |
| 7,480,958 B2 | 1/2009 | Song |
| 7,480,960 B2 | 1/2009 | Kim |
| D586,959 S | 2/2009 | Geringer |
| 7,489,277 B2 | 2/2009 | Sung |
| 7,489,985 B2 | 2/2009 | Ko |
| 7,499,774 B2 | 3/2009 | Barrett |
| 7,499,775 B2 | 3/2009 | Filippov |
| 7,499,776 B2 | 3/2009 | Allard |
| 7,499,804 B2 | 3/2009 | Svendsen |
| 7,503,096 B2 | 3/2009 | Lin |
| 7,515,991 B2 | 4/2009 | Egawa |
| D593,265 S | 5/2009 | Carr |
| 7,539,557 B2 | 5/2009 | Yamauchi |
| 7,546,891 B2 | 6/2009 | Won |
| 7,546,912 B1 | 6/2009 | Pack |
| 7,555,363 B2 | 6/2009 | Augenbraun |
| 7,556,108 B2 | 7/2009 | Won |
| 7,559,269 B2 | 7/2009 | Rudakevych |
| 7,564,571 B2 | 7/2009 | Karabassi |
| 7,566,839 B2 | 7/2009 | Hukuba |
| 7,567,052 B2 | 7/2009 | Jones |
| 7,568,259 B2 | 8/2009 | Yan |
| 7,568,536 B2 | 8/2009 | Yu |
| 7,571,511 B2 | 8/2009 | Jones |
| 7,573,403 B2 | 8/2009 | Goncalves |
| 7,574,282 B2 | 8/2009 | Petersson |
| 7,578,020 B2 | 8/2009 | Jaworski |
| 7,579,803 B2 | 8/2009 | Jones |
| 7,581,282 B2 | 9/2009 | Woo |
| 7,597,162 B2 | 10/2009 | Won |
| 7,600,521 B2 | 10/2009 | Woo |
| 7,600,593 B2 | 10/2009 | Filippov |
| 7,603,744 B2 | 10/2009 | Reindle |
| 7,604,675 B2 | 10/2009 | Makarov |
| 7,610,651 B2 | 11/2009 | Baek |
| 7,613,543 B2 | 11/2009 | Petersson |
| 7,620,476 B2 | 11/2009 | Morse |
| 7,636,982 B2 | 12/2009 | Jones |
| 7,647,144 B2 | 1/2010 | Haegermarck |
| 7,650,666 B2 | 1/2010 | Jang |
| 7,654,348 B2 | 2/2010 | Ohm |
| 7,660,650 B2 | 2/2010 | Kawagoe |
| 7,663,333 B2 | 2/2010 | Jones |
| 7,673,367 B2 | 3/2010 | Kim |
| 7,679,532 B2 | 3/2010 | Karlsson |
| 7,688,676 B2 | 3/2010 | Chiappetta |
| 7,693,654 B1 | 4/2010 | Dietsch |
| 7,697,141 B2 | 4/2010 | Jones |
| 7,706,917 B1 | 4/2010 | Chiappetta |
| 7,706,921 B2 | 4/2010 | Jung |
| 7,709,497 B2 | 5/2010 | Christensen, IV |
| 7,711,450 B2 | 5/2010 | Im |
| 7,720,572 B2 | 5/2010 | Ziegler |
| 7,721,829 B2 | 5/2010 | Lee |
| 7,729,801 B2 | 6/2010 | Abramson |
| 7,749,294 B2 | 7/2010 | Oh |
| 7,751,940 B2 | 7/2010 | Lee |
| 7,761,954 B2 | 7/2010 | Ziegler |
| 7,765,635 B2 | 8/2010 | Park |
| 7,765,638 B2 | 8/2010 | Pineschi |
| 7,769,490 B2 | 8/2010 | Abramson |
| 7,774,158 B2 | 8/2010 | Domingues Goncalves |
| 7,779,504 B2 | 8/2010 | Lee |
| 7,780,796 B2 | 8/2010 | Shim |
| 7,784,139 B2 | 8/2010 | Sawalski |
| 7,784,570 B2 | 8/2010 | Couture |
| 7,785,544 B2 | 8/2010 | Alward |
| 7,787,991 B2 | 8/2010 | Jeung |
| 7,793,614 B2 | 9/2010 | Ericsson |
| 7,801,645 B2 | 9/2010 | Taylor |
| 7,805,220 B2 | 9/2010 | Taylor |
| 7,827,653 B1 | 11/2010 | Liu |
| 7,832,048 B2 | 11/2010 | Harwig |
| 7,835,529 B2 | 11/2010 | Hernandez |
| 7,843,431 B2 | 11/2010 | Robbins |
| 7,844,364 B2 | 11/2010 | McLurkin |
| 7,849,555 B2 | 12/2010 | Hahm |
| 7,856,291 B2 | 12/2010 | Jung |
| 7,860,608 B2 | 12/2010 | Lee |
| 7,861,365 B2 | 1/2011 | Sun |
| 7,861,366 B2 | 1/2011 | Hahm |
| 7,873,437 B2 | 1/2011 | Aldred |
| 7,877,166 B2 | 1/2011 | Harwig |
| 7,886,399 B2 | 2/2011 | Dayton |
| 7,890,210 B2 | 2/2011 | Choi |
| 7,891,045 B2 | 2/2011 | Kim |
| 7,891,289 B2 | 2/2011 | Day |
| 7,891,446 B2 | 2/2011 | Couture |
| 7,894,951 B2 | 2/2011 | Norris |
| 7,916,931 B2 | 3/2011 | Lee |
| 7,920,941 B2 | 4/2011 | Park |
| 7,921,506 B2 | 4/2011 | Baek |
| 7,926,598 B2 | 4/2011 | Rudakevych |
| 7,930,797 B2 * | 4/2011 | Yoo .................. A47L 9/0494 15/368 |
| 7,934,571 B2 | 5/2011 | Chiu |
| 7,937,800 B2 | 5/2011 | Yan |
| 7,942,107 B2 | 5/2011 | Vosburgh |
| 7,957,837 B2 | 6/2011 | Ziegler |
| 7,962,997 B2 | 6/2011 | Chung |
| 7,966,339 B2 | 6/2011 | Kim |
| 7,975,790 B2 | 7/2011 | Kim |
| 7,979,175 B2 | 7/2011 | Allard |
| 7,979,945 B2 | 7/2011 | Dayton |
| 7,981,455 B2 | 7/2011 | Sus |
| 7,997,118 B2 | 8/2011 | Mecca |
| 8,001,651 B2 | 8/2011 | Chang |
| 8,007,221 B1 | 8/2011 | More |
| 8,010,229 B2 | 8/2011 | Kim |
| 8,019,223 B2 | 9/2011 | Hudson |
| 8,020,657 B2 | 9/2011 | Allard |
| 8,032,978 B2 | 10/2011 | Haegermarck |
| 8,034,390 B2 | 10/2011 | Sus |
| 8,042,663 B1 | 10/2011 | Pack |
| 8,046,103 B2 | 10/2011 | Abramson |
| 8,061,461 B2 | 11/2011 | Couture |
| 8,065,778 B2 | 11/2011 | Kim |
| 8,073,439 B2 | 12/2011 | Stromberg |
| 8,074,752 B2 | 12/2011 | Rudakevych |
| 8,078,338 B2 | 12/2011 | Pack |
| 8,079,432 B2 | 12/2011 | Ohm |
| 8,082,836 B2 | 12/2011 | More |
| 8,086,419 B2 | 12/2011 | Goncalves |
| 8,087,117 B2 | 1/2012 | Kapoor |
| 8,095,238 B2 | 1/2012 | Jones |
| 8,095,336 B2 | 1/2012 | Goncalves |
| 8,107,318 B2 | 1/2012 | Chiappetta |
| 8,108,092 B2 | 1/2012 | Phillips |
| 8,109,191 B1 | 2/2012 | Rudakevych |
| 8,112,942 B2 | 2/2012 | Bohm |
| 8,113,304 B2 | 2/2012 | Won |
| 8,122,982 B2 | 2/2012 | Morey |
| 8,127,396 B2 | 3/2012 | Mangiardi |
| 8,127,399 B2 | 3/2012 | Dilger |
| 8,127,704 B2 | 3/2012 | Vosburgh |
| 8,136,200 B2 | 3/2012 | Splinter |

(56) References Cited

U.S. PATENT DOCUMENTS

| | | |
|---|---|---|
| 8,150,650 B2 | 4/2012 | Goncalves |
| D659,311 S | 5/2012 | Geringer |
| 8,166,904 B2 | 5/2012 | Israel |
| 8,195,333 B2 | 6/2012 | Ziegler |
| 8,196,251 B2 | 6/2012 | Lynch |
| 8,199,109 B2 | 6/2012 | Robbins |
| 8,200,600 B2 | 6/2012 | Rosenstein |
| 8,200,700 B2 | 6/2012 | Moore |
| 8,237,389 B2 | 8/2012 | Fitch |
| 8,237,920 B2 | 8/2012 | Jones |
| 8,239,992 B2 | 8/2012 | Schnittman |
| 8,244,469 B2 | 8/2012 | Cheung |
| 8,253,368 B2 | 8/2012 | Landry |
| 8,255,092 B2 | 8/2012 | Phillips |
| 8,256,542 B2 | 9/2012 | Couture |
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |
| 8,295,125 B2 | 10/2012 | Chiappetta |
| D670,877 S | 11/2012 | Geringer |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jones |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 | 8/2013 | Chiappetta |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steltz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,671,513 B2 | 3/2014 | Yoo |
| 8,732,895 B2 | 5/2014 | Cunningham |
| 8,741,013 B2 | 6/2014 | Swett |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,780,342 B2 | 7/2014 | Dibernardo |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,880,342 B2 | 11/2014 | Ando |
| 8,881,339 B2 | 11/2014 | Gilbert |
| 8,924,042 B2 | 12/2014 | Kim |
| 8,961,695 B2 * | 2/2015 | Romanov ............ A47L 11/4066 15/340.1 |
| 8,985,127 B2 | 3/2015 | Konandreas |
| 8,996,172 B2 | 3/2015 | Shah |
| 9,033,079 B2 | 5/2015 | Shin |
| 9,037,396 B2 | 5/2015 | Pack |
| 9,052,721 B1 | 6/2015 | Dowdall |
| 9,104,206 B2 | 8/2015 | Biber |
| 9,144,361 B2 | 9/2015 | Landry |
| 9,215,957 B2 | 12/2015 | Cohen |
| 9,223,312 B2 | 12/2015 | Goel et al. |
| 9,259,129 B2 | 2/2016 | Jang |
| 9,360,300 B2 | 6/2016 | EnricoDiBernado |
| 9,392,920 B2 | 7/2016 | Halloran |
| 9,436,318 B2 | 9/2016 | Omura |
| 9,550,294 B2 | 1/2017 | Cohen |
| 9,596,971 B2 | 3/2017 | Yoon |
| 9,629,514 B2 | 4/2017 | Hillen |
| 9,687,132 B2 | 6/2017 | SchlischkaCK |
| 9,775,476 B2 | 10/2017 | Jang et al. |
| 9,939,529 B2 | 4/2018 | Haegermarck |
| 9,993,129 B2 * | 6/2018 | Santini ................ A47L 11/4011 |
| 9,999,328 B2 | 6/2018 | VVanderstegen-Drake |
| 10,045,675 B2 | 8/2018 | Haegermarck |
| 10,247,669 B2 | 4/2019 | WindorferD |
| 10,296,007 B2 | 5/2019 | Vicenti |

(56) References Cited

U.S. PATENT DOCUMENTS

| | | | |
|---|---|---|---|
| 10,518,416 B2* | 12/2019 | Haegermarck | B25J 9/1692 |
| 10,766,132 B2* | 9/2020 | Romanov | G05D 1/0219 |
| 2001/0004719 A1 | 6/2001 | Sommer | |
| 2001/0037163 A1 | 11/2001 | Allard | |
| 2002/0016649 A1 | 2/2002 | Jones | |
| 2002/0091466 A1 | 7/2002 | Song | |
| 2002/0108635 A1 | 8/2002 | Marrero | |
| 2002/0121288 A1 | 9/2002 | Marrero | |
| 2002/0121561 A1 | 9/2002 | Marrero | |
| 2002/0153185 A1 | 10/2002 | Song | |
| 2002/0164932 A1 | 11/2002 | Kamimura | |
| 2002/0174506 A1 | 11/2002 | Wallach | |
| 2002/0185071 A1 | 12/2002 | Guo | |
| 2002/0189871 A1 | 12/2002 | Won | |
| 2003/0000034 A1 | 1/2003 | Welsh | |
| 2003/0025472 A1 | 2/2003 | Jones | |
| 2003/0030398 A1 | 2/2003 | Jacobs | |
| 2003/0120972 A1 | 6/2003 | Matsushima | |
| 2003/0140449 A1 | 7/2003 | Alton | |
| 2003/0159223 A1 | 8/2003 | Plankenhorn | |
| 2003/0167000 A1 | 9/2003 | Mullick | |
| 2003/0229421 A1 | 12/2003 | Chmura | |
| 2004/0020000 A1 | 2/2004 | Jones | |
| 2004/0031111 A1 | 2/2004 | Porchia | |
| 2004/0031121 A1 | 2/2004 | Martin | |
| 2004/0034952 A1 | 2/2004 | Ho | |
| 2004/0049877 A1 | 3/2004 | Jones | |
| 2004/0049878 A1 | 3/2004 | Thomas | |
| 2004/0074038 A1 | 4/2004 | Im | |
| 2004/0074039 A1 | 4/2004 | Kim | |
| 2004/0098167 A1 | 5/2004 | Yi | |
| 2004/0111184 A1 | 6/2004 | Chiappetta | |
| 2004/0111827 A1 | 6/2004 | Im | |
| 2004/0158357 A1* | 8/2004 | Lee | G05D 1/0227 |
| | | | 700/258 |
| 2004/0167667 A1 | 8/2004 | Goncalves | |
| 2004/0181896 A1 | 9/2004 | Egawa | |
| 2004/0182839 A1 | 9/2004 | Denney | |
| 2004/0182840 A1 | 9/2004 | Denney | |
| 2004/0185011 A1 | 9/2004 | Alexander | |
| 2004/0187249 A1 | 9/2004 | Jones | |
| 2004/0207355 A1 | 10/2004 | Jones | |
| 2004/0208212 A1 | 10/2004 | Denney | |
| 2004/0210343 A1 | 10/2004 | Kim | |
| 2004/0220707 A1 | 11/2004 | Pallister | |
| 2005/0000543 A1 | 1/2005 | Taylor | |
| 2005/0010331 A1 | 1/2005 | Taylor | |
| 2005/0015912 A1 | 1/2005 | Kim | |
| 2005/0015915 A1 | 1/2005 | Thomas | |
| 2005/0021181 A1 | 1/2005 | Kim et al. | |
| 2005/0028315 A1 | 2/2005 | Thomas | |
| 2005/0028316 A1 | 2/2005 | Thomas | |
| 2005/0042151 A1 | 2/2005 | Alward | |
| 2005/0065662 A1 | 3/2005 | Reindle | |
| 2005/0085947 A1 | 4/2005 | MichaelAldred | |
| 2005/0088643 A1 | 4/2005 | Anderson | |
| 2005/0156562 A1 | 7/2005 | Cohen | |
| 2005/0166354 A1* | 8/2005 | Uehigashi | G05D 1/0274 |
| | | | 15/319 |
| 2005/0166355 A1* | 8/2005 | Tani | A47L 9/281 |
| | | | 15/319 |
| 2005/0171638 A1* | 8/2005 | Uehigashi | G05D 1/0238 |
| | | | 701/23 |
| 2005/0171644 A1* | 8/2005 | Tani | A47L 9/2826 |
| | | | 701/25 |
| 2005/0172435 A1 | 8/2005 | Bernini | |
| 2005/0191949 A1 | 9/2005 | Kamimura | |
| 2005/0217061 A1 | 10/2005 | Reindle | |
| 2005/0223514 A1 | 10/2005 | Stuchlik | |
| 2005/0229340 A1 | 10/2005 | Sawalski | |
| 2005/0230166 A1 | 10/2005 | Petersson | |
| 2005/0234611 A1 | 10/2005 | Uehigashi | |
| 2005/0251292 A1 | 11/2005 | Casey | |
| 2005/0251457 A1 | 11/2005 | Kashiwagi | |
| 2005/0251947 A1 | 11/2005 | Lee | |
| 2005/0267629 A1 | 12/2005 | Petersson | |
| 2005/0278888 A1 | 12/2005 | Reindle | |
| 2005/0287038 A1 | 12/2005 | Dubrovsky | |
| 2006/0006316 A1 | 1/2006 | Takenaka | |
| 2006/0009879 A1 | 1/2006 | Lynch | |
| 2006/0010799 A1 | 1/2006 | Bohm | |
| 2006/0020369 A1 | 1/2006 | Taylor | |
| 2006/0020370 A1 | 1/2006 | Abramson | |
| 2006/0028306 A1 | 2/2006 | Hukuba | |
| 2006/0032013 A1 | 2/2006 | Kim | |
| 2006/0045981 A1 | 3/2006 | Tsushi | |
| 2006/0047364 A1* | 3/2006 | Tani | A47L 9/009 |
| | | | 701/23 |
| 2006/0076039 A1 | 4/2006 | Song | |
| 2006/0095158 A1 | 5/2006 | Lee | |
| 2006/0136096 A1 | 6/2006 | Chiappetta | |
| 2006/0144834 A1 | 7/2006 | Denney | |
| 2006/0178777 A1 | 8/2006 | Park | |
| 2006/0190133 A1 | 8/2006 | Konandreas | |
| 2006/0190134 A1 | 8/2006 | Ziegler | |
| 2006/0190146 A1 | 8/2006 | Morse | |
| 2006/0195015 A1 | 8/2006 | Mullick | |
| 2006/0200281 A1 | 9/2006 | Ziegler | |
| 2006/0213025 A1 | 9/2006 | Sawalski | |
| 2006/0235570 A1 | 10/2006 | Jung | |
| 2006/0235585 A1 | 10/2006 | HirotoTanaka | |
| 2006/0236492 A1 | 10/2006 | KazuyaSudo | |
| 2006/0288519 A1 | 12/2006 | Jaworski | |
| 2006/0293788 A1 | 12/2006 | Pogodin | |
| 2007/0016328 A1 | 1/2007 | Ziegler | |
| 2007/0021867 A1 | 1/2007 | Woo | |
| 2007/0059441 A1 | 3/2007 | Greer | |
| 2007/0061040 A1 | 3/2007 | Augenbraun | |
| 2007/0114975 A1 | 5/2007 | Cohen | |
| 2007/0118248 A1 | 5/2007 | Lee | |
| 2007/0124890 A1 | 6/2007 | Erko | |
| 2007/0136981 A1 | 6/2007 | Dliger et al. | |
| 2007/0143950 A1 | 6/2007 | Lin | |
| 2007/0156286 A1 | 7/2007 | Yamauchi | |
| 2007/0179670 A1 | 8/2007 | Chiappetta | |
| 2007/0189347 A1 | 8/2007 | Denney | |
| 2007/0204426 A1 | 9/2007 | Nakagawa | |
| 2007/0213892 A1 | 9/2007 | Jones | |
| 2007/0214601 A1 | 9/2007 | Chung | |
| 2007/0234492 A1 | 10/2007 | Svendsen | |
| 2007/0244610 A1 | 10/2007 | Ozick | |
| 2007/0250212 A1 | 10/2007 | Halloran | |
| 2007/0266508 A1 | 11/2007 | Jones | |
| 2007/0267230 A1 | 11/2007 | Won | |
| 2007/0267570 A1 | 11/2007 | Park | |
| 2007/0267998 A1 | 11/2007 | Cohen | |
| 2007/0273864 A1 | 11/2007 | Cho | |
| 2007/0276541 A1 | 11/2007 | Sawasaki | |
| 2007/0285041 A1 | 12/2007 | Jones | |
| 2007/0289267 A1 | 12/2007 | Makarov | |
| 2007/0290649 A1 | 12/2007 | Jones | |
| 2008/0000041 A1 | 1/2008 | Jones | |
| 2008/0000042 A1 | 1/2008 | Jones | |
| 2008/0001566 A1 | 1/2008 | Jones | |
| 2008/0007203 A1 | 1/2008 | Cohen | |
| 2008/0009964 A1 | 1/2008 | Bruemmer | |
| 2008/0015738 A1 | 1/2008 | Casey | |
| 2008/0016631 A1 | 1/2008 | Casey | |
| 2008/0037170 A1 | 2/2008 | Saliba | |
| 2008/0039974 A1 | 2/2008 | Sandin | |
| 2008/0047092 A1 | 2/2008 | Schnittman | |
| 2008/0051953 A1 | 2/2008 | Jones | |
| 2008/0007193 A1 | 3/2008 | Bow | |
| 2008/0052846 A1 | 3/2008 | Kapoor | |
| 2008/0058987 A1 | 3/2008 | Ozick | |
| 2008/0063400 A1 | 3/2008 | Hudson | |
| 2008/0065265 A1 | 3/2008 | Ozick | |
| 2008/0077278 A1 | 3/2008 | Park | |
| 2008/0079383 A1 | 4/2008 | Nakamoto | |
| 2008/0084174 A1 | 4/2008 | Jones | |
| 2008/0086241 A1 | 4/2008 | Phillips | |
| 2008/0091304 A1 | 4/2008 | Ozick | |
| 2008/0091305 A1 | 4/2008 | Svendsen | |

(56) References Cited

U.S. PATENT DOCUMENTS

| | | |
|---|---|---|
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1 | 9/2008 | ErwannLavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0030551 A1 | 1/2009 | Hein |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto |
| 2009/0232506 A1 | 9/2009 | Hudson |
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0281661 A1 | 11/2009 | Dooley |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0054129 A1 | 3/2010 | Kuik |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0161225 A1 | 6/2010 | Hyung |
| 2010/0173070 A1 | 7/2010 | Niu |
| 2010/0206336 A1 | 8/2010 | Souid |
| 2010/0217436 A1 | 8/2010 | Jones |
| 2010/0256812 A1 | 10/2010 | Tsusaka et al. |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0268385 A1* | 10/2010 | Rew .................. G05D 1/0253 700/259 |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1 | 4/2011 | Escrig |
| 2011/0088609 A1 | 4/2011 | Vosburgh |
| 2011/0109549 A1 | 5/2011 | Robbins |
| 2011/0125323 A1 | 5/2011 | Gutmann |
| 2011/0131741 A1 | 6/2011 | Jones |
| 2011/0154589 A1 | 6/2011 | Reindle |
| 2011/0202175 A1* | 8/2011 | Romanov ............ A47L 11/4036 700/250 |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0106829 A1 | 5/2012 | Lee |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |

(56) References Cited

U.S. PATENT DOCUMENTS

| | | |
|---|---|---|
| 2012/0167917 A1 | 7/2012 | Gilbert |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0194427 A1 | 8/2012 | Lee et al. |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0219207 A1 | 8/2012 | Shin et al. |
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1 | 4/2013 | Yoon |
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |
| 2013/0138246 A1 | 5/2013 | Gutmann |
| 2013/0138337 A1 | 5/2013 | Pack |
| 2013/0145572 A1 | 6/2013 | Schregardus |
| 2013/0152724 A1 | 6/2013 | Mozeika |
| 2013/0152970 A1 | 6/2013 | Porat |
| 2013/0160226 A1 | 6/2013 | Lee |
| 2013/0166107 A1 | 6/2013 | Robbins |
| 2013/0174371 A1 | 7/2013 | Jones |
| 2013/0198481 A1 | 8/2013 | Gander |
| 2013/0200993 A1 | 8/2013 | Wu |
| 2013/0204463 A1 | 8/2013 | Chiappetta |
| 2013/0204465 A1 | 8/2013 | Phillips |
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1 | 8/2013 | Burlutskiy |
| 2013/0211589 A1 | 8/2013 | Landry |
| 2013/0214498 A1 | 8/2013 | DeFazio |
| 2013/0226344 A1 | 8/2013 | Wong |
| 2013/0227801 A1 | 9/2013 | Kim |
| 2013/0227812 A1 | 9/2013 | Kim |
| 2013/0228198 A1 | 9/2013 | Hung |
| 2013/0228199 A1 | 9/2013 | Hung |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |
| 2013/0253701 A1 | 9/2013 | Halloran |
| 2013/0256042 A1 | 10/2013 | Rudakevych |
| 2013/0268118 A1 | 10/2013 | Grinstead |
| 2013/0269148 A1 | 10/2013 | Chiu |
| 2013/0273252 A1 | 10/2013 | Miyamoto |
| 2013/0298350 A1 | 11/2013 | Schnittman |
| 2013/0310978 A1 | 11/2013 | Ozick |
| 2013/0317944 A1 | 11/2013 | Huang |
| 2013/0325178 A1 | 12/2013 | Jones |
| 2013/0331987 A1 | 12/2013 | Karlsson |
| 2013/0331988 A1* | 12/2013 | Goel ................ B25J 5/007 700/254 |
| 2013/0331990 A1* | 12/2013 | Jeong ................ G01S 17/46 348/118 |
| 2013/0338525 A1 | 12/2013 | Allen |
| 2013/0338828 A1 | 12/2013 | Chiappetta |
| 2013/0338831 A1* | 12/2013 | Noh ................ G05D 1/0248 700/259 |
| 2013/0340201 A1* | 12/2013 | Jang ................ A47L 9/009 15/300.1 |
| 2014/0016469 A1 | 1/2014 | Ho |
| 2014/0026338 A1 | 1/2014 | Kim |
| 2014/0026339 A1 | 1/2014 | Konandreas |
| 2014/0036062 A1* | 2/2014 | Yoon ................ G01V 8/10 348/118 |
| 2014/0053351 A1 | 2/2014 | Kapoor |
| 2014/0109339 A1 | 4/2014 | Won |
| 2014/0123325 A1 | 5/2014 | Jung |
| 2014/0130272 A1 | 5/2014 | Won |
| 2014/0142757 A1 | 5/2014 | Ziegler |
| 2014/0166047 A1 | 6/2014 | Hillen |
| 2014/0167931 A1 | 6/2014 | Lee |
| 2014/0180968 A1 | 6/2014 | Song |
| 2014/0184144 A1 | 7/2014 | Henricksen |
| 2014/0207280 A1 | 7/2014 | Duffley |
| 2014/0207281 A1 | 7/2014 | Angle |
| 2014/0207282 A1 | 7/2014 | Angle |
| 2014/0214205 A1* | 7/2014 | Kwon ................ A47L 11/4011 700/258 |
| 2014/0238440 A1 | 8/2014 | Dayton |
| 2014/0249671 A1 | 9/2014 | Halloran |
| 2014/0283326 A1 | 9/2014 | Song |
| 2015/0000068 A1 | 1/2015 | Tsuboi |
| 2015/0005937 A1 | 1/2015 | Ponulak |
| 2015/0032259 A1 | 1/2015 | Kim |
| 2015/0033488 A1 | 2/2015 | Varila |
| 2015/0039127 A1 | 2/2015 | Matsumoto |
| 2015/0057800 A1 | 2/2015 | Cohen |
| 2015/0120056 A1* | 4/2015 | Noh ................ G01S 17/46 901/1 |
| 2015/0158174 A1* | 6/2015 | Romanov ................ B25J 13/08 700/250 |
| 2015/0185322 A1 | 7/2015 | Haegermarck |
| 2015/0197012 A1 | 7/2015 | Schnittman |
| 2015/0206015 A1 | 7/2015 | Ramalingam |
| 2015/0265122 A1 | 9/2015 | Han |
| 2015/0362921 A1* | 12/2015 | Hanaoka ................ G05D 1/0088 702/159 |
| 2015/0367512 A1* | 12/2015 | Hong ................ G05D 1/0246 901/1 |
| 2016/0007817 A1* | 1/2016 | Schlischka ................ A47L 11/4061 280/5.514 |
| 2016/0008982 A1 | 1/2016 | Artes |
| 2016/0103451 A1* | 4/2016 | Vicenti ................ A47L 11/4061 700/259 |
| 2016/0144511 A1 | 5/2016 | Ramanov et al. |
| 2016/0167226 A1 | 6/2016 | Schnittman |
| 2016/0202703 A1 | 7/2016 | Matsubara |

(56) References Cited

U.S. PATENT DOCUMENTS

| | | | |
|---|---|---|---|
| 2016/0235270 A1 | 8/2016 | Santini | |
| 2016/0298970 A1 | 10/2016 | Lindhe | |
| 2016/0306359 A1 | 10/2016 | MagnusLindhe | |
| 2016/0316982 A1 | 11/2016 | Kim | |
| 2017/0197315 A1* | 7/2017 | Haegermarck | G05D 1/0248 |
| 2017/0273521 A1 | 9/2017 | Klintemyr | |
| 2017/0273524 A1 | 9/2017 | Klintemyr | |
| 2017/0296021 A1 | 10/2017 | Li | |
| 2017/0344013 A1 | 11/2017 | Haegermarck | |
| 2017/0344019 A1 | 11/2017 | Haegermarck et al. | |
| 2018/0088583 A1 | 3/2018 | Wang et al. | |
| 2018/0103812 A1 | 4/2018 | Lee | |
| 2019/0086933 A1 | 3/2019 | Munich et al. | |
| 2021/0053207 A1* | 2/2021 | Romanov | A47L 11/4066 |

FOREIGN PATENT DOCUMENTS

| | | |
|---|---|---|
| CN | 1668238 | 9/2005 |
| CN | 1883889 | 12/2006 |
| CN | 1985738 A | 6/2007 |
| CN | 101161174 | 4/2008 |
| CN | 101297267 | 10/2008 |
| CN | 102046059 | 5/2011 |
| CN | 102083352 | 6/2011 |
| CN | 201861561 U | 6/2011 |
| CN | 102183959 | 9/2011 |
| CN | 102506748 | 6/2012 |
| CN | 102949144 | 3/2013 |
| CN | 103027634 | 4/2013 |
| CN | 103054516 | 4/2013 |
| CN | 103308050 | 9/2013 |
| CN | 103376801 | 10/2013 |
| CN | 103491838 | 1/2014 |
| CN | 103505155 A | 1/2014 |
| CN | 103534659 | 1/2014 |
| CN | 103565373 | 2/2014 |
| CN | 103948354 | 7/2014 |
| CN | 104302453 A | 1/2015 |
| CN | 105326442 A | 2/2016 |
| CN | 205091616 U | 3/2016 |
| CN | 105982611 | 10/2016 |
| DE | 3536907 | 4/1986 |
| DE | 9307500 | 7/1993 |
| DE | 4211789 | 10/1993 |
| DE | 4340367 | 6/1995 |
| DE | 4439427 | 5/1996 |
| DE | 19849978 | 5/2000 |
| DE | 10311299 | 4/2004 |
| DE | 202008017137 | 3/2009 |
| DE | 102010000174 | 7/2011 |
| DE | 102010000573 | 9/2011 |
| DE | 102010037672 | 3/2012 |
| DE | 202017000833 | 3/2017 |
| EP | 0142594 | 5/1985 |
| EP | 0358628 | 3/1990 |
| EP | 0474542 | 3/1992 |
| EP | 0569984 | 11/1993 |
| EP | 0606173 | 7/1994 |
| EP | 1099143 | 11/2003 |
| EP | 1360922 | 11/2003 |
| EP | 1441271 | 7/2004 |
| EP | 1331537 | 8/2005 |
| EP | 2050380 | 4/2009 |
| EP | 1969438 | 9/2009 |
| EP | 1395888 | 5/2011 |
| EP | 2316322 | 5/2011 |
| EP | 2322071 | 5/2011 |
| EP | 2296005 | 6/2011 |
| EP | 2251757 | 11/2011 |
| EP | 2417894 | 2/2012 |
| EP | 2438843 | 4/2012 |
| EP | 2466411 | 6/2012 |
| EP | 2502540 | 9/2012 |
| EP | 2561787 | 2/2013 |
| EP | 2578125 | 4/2013 |
| EP | 2583609 | 4/2013 |
| EP | 2604163 | 6/2013 |
| EP | 2624177 | 8/2013 |
| EP | 2679130 A1 | 1/2014 |
| EP | 2447800 | 4/2014 |
| EP | 2741483 | 6/2014 |
| EP | 2772815 | 9/2014 |
| EP | 2992803 | 3/2016 |
| EP | 3047782 | 7/2016 |
| EP | 3199083 | 8/2017 |
| FR | 2999410 | 6/2014 |
| GB | 1447943 | 9/1976 |
| GB | 2355523 | 4/2001 |
| GB | 2382251 | 5/2003 |
| GB | 2494446 | 3/2013 |
| GB | 2884364 | 6/2015 |
| JP | 5540959 | 3/1980 |
| JP | 6286414 | 4/1987 |
| JP | 62109528 | 5/1987 |
| JP | 62120510 | 6/1987 |
| JP | 62152421 | 7/1987 |
| JP | 62152424 | 7/1987 |
| JP | 63127310 | 5/1988 |
| JP | 63181727 | 7/1988 |
| JP | 63241610 | 10/1988 |
| JP | 03162814 | 7/1991 |
| JP | 03166074 | 7/1991 |
| JP | 04260905 | 9/1992 |
| JP | 0584200 | 4/1993 |
| JP | 0584210 | 4/1993 |
| JP | 05084200 | 4/1993 |
| JP | 05184489 A | 7/1993 |
| JP | 05189041 | 7/1993 |
| JP | 05224745 | 9/1993 |
| JP | 05228090 | 9/1993 |
| JP | 064133 | 1/1994 |
| JP | 0643935 A | 2/1994 |
| JP | 0683442 | 3/1994 |
| JP | 06125861 | 5/1994 |
| JP | 06144215 | 5/1994 |
| JP | 06179145 | 6/1994 |
| JP | 075922 | 1/1995 |
| JP | 0759695 | 3/1995 |
| JP | 0732752 | 4/1995 |
| JP | 07129239 | 5/1995 |
| JP | 07281742 | 10/1995 |
| JP | 07287617 | 10/1995 |
| JP | 08089455 | 4/1996 |
| JP | 08286746 A | 11/1996 |
| JP | 08326025 | 12/1996 |
| JP | 0944240 | 2/1997 |
| JP | 09150741 | 6/1997 |
| JP | 09185410 | 7/1997 |
| JP | 11267074 | 10/1999 |
| JP | 2001022443 | 1/2001 |
| JP | 2001187009 | 7/2001 |
| JP | 2002287824 | 10/2002 |
| JP | 2002533797 | 10/2002 |
| JP | 2002355204 | 12/2002 |
| JP | 2002366228 | 12/2002 |
| JP | 2003505127 | 2/2003 |
| JP | 2003116758 A | 4/2003 |
| JP | 2003180587 | 7/2003 |
| JP | 2003225184 | 8/2003 |
| JP | 2003280740 | 10/2003 |
| JP | 2004096253 | 3/2004 |
| JP | 2004136144 | 5/2004 |
| JP | 2004166968 | 6/2004 |
| JP | 2004198212 | 7/2004 |
| JP | 2004303134 | 10/2004 |
| JP | 200540597 | 2/2005 |
| JP | 2005050105 | 2/2005 |
| JP | 2005124753 | 5/2005 |
| JP | 2005141636 | 6/2005 |
| JP | 2005192609 | 7/2005 |
| JP | 2005314116 | 11/2005 |
| JP | 2006015113 | 1/2006 |
| JP | 2006087507 | 4/2006 |
| JP | 2006231477 | 9/2006 |

(56) References Cited

FOREIGN PATENT DOCUMENTS

| | | |
|---|---|---|
| JP | 2006314669 | 11/2006 |
| JP | 2007014369 | 1/2007 |
| JP | 2007070658 | 3/2007 |
| JP | 2007143645 | 6/2007 |
| JP | 2006185438 | 7/2007 |
| JP | 2007213236 | 8/2007 |
| JP | 2007226322 | 9/2007 |
| JP | 2007272665 | 10/2007 |
| JP | 2008132299 | 6/2008 |
| JP | 2008146617 | 6/2008 |
| JP | 2008290184 | 12/2008 |
| JP | 2008543394 | 12/2008 |
| JP | 2009500741 | 1/2009 |
| JP | 2009509220 | 3/2009 |
| JP | 2009193240 | 8/2009 |
| JP | 2010507169 | 3/2010 |
| JP | 201079869 | 4/2010 |
| JP | 2010094802 A | 4/2010 |
| JP | 2010526594 | 8/2010 |
| JP | 2010534825 | 11/2010 |
| JP | 2011045694 | 3/2011 |
| JP | 2011133405 A | 7/2011 |
| JP | 2011253361 | 12/2011 |
| JP | 2012216051 | 11/2012 |
| JP | 2013041506 | 2/2013 |
| JP | 2013059625 | 4/2013 |
| JP | 201389256 | 5/2013 |
| JP | 2013089256 | 5/2013 |
| JP | 2013247986 | 12/2013 |
| JP | 2014023930 | 2/2014 |
| JP | 2014048842 A | 3/2014 |
| JP | 2014193383 | 10/2014 |
| JP | 2015521760 A | 7/2015 |
| JP | 2015534048 A | 11/2015 |
| KR | 950002044 | 3/1995 |
| KR | 20040096253 | 11/2004 |
| KR | 20050003112 | 1/2005 |
| KR | 100544479 | 1/2006 |
| KR | 20070070658 | 7/2007 |
| KR | 20090028359 | 3/2009 |
| KR | 20090076738 | 7/2009 |
| KR | 20120047137 | 5/2012 |
| KR | 20130002218 A | 1/2013 |
| KR | 101231932 | 3/2013 |
| KR | 101338143 B1 | 12/2013 |
| KR | 20150124011 | 11/2015 |
| KR | 101613467 B1 | 4/2016 |
| KR | 101650128 B1 | 8/2016 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 0182766 | 11/2001 |
| WO | 03022120 | 3/2003 |
| WO | 03024292 | 3/2003 |
| WO | 2003026474 | 4/2003 |
| WO | 2004006034 | 1/2004 |
| WO | 2004082899 | 9/2004 |
| WO | 2007008148 | 1/2007 |
| WO | 2007028049 | 3/2007 |
| WO | 2007051972 | 5/2007 |
| WO | 2007065034 | 6/2007 |
| WO | 2008048260 | 4/2008 |
| WO | 2009132317 | 10/2009 |
| WO | 2011003667 | 1/2011 |
| WO | 2012008702 | 1/2012 |
| WO | 2013105431 | 7/2013 |
| WO | 2013157324 | 10/2013 |
| WO | 2013162094 | 10/2013 |
| WO | 2014033055 | 3/2014 |
| WO | 2014151501 | 9/2014 |
| WO | 2015016580 | 2/2015 |
| WO | 2015090402 | 6/2015 |
| WO | 2016005011 | 1/2016 |
| WO | 2016130188 A1 | 8/2016 |

OTHER PUBLICATIONS

Korean Office Action issued in Korean Application No. 10-2019-7034477, dated Aug. 23, 2021, 6 pages.
USPTO Notice of Allowance issued in U.S. Appl. No. 15/534,327, dated Aug. 13, 2020, 5 pages.
Chinese Office Action issued in Chinese Patent Application No. 201780090566X, dated Feb. 1, 2021, 11 pages.
Chinese Office Action issued in Chinese Application No. 2014800837122, dated Jul. 17, 2020 with translation, 18 pages.
Japanese Notice of Reasons for Refusal issued in Japanese Application No. 2019-542478, dated Mar. 16, 2021 with translation, 5 pages.
Japanese Notice of Reasons for Refusal issued in Japanese Application No. 2019-557633, dated Mar. 18, 2021 with translation, 9 pages.
USPTO Final Office Action issued in U.S. Appl. No. 16/083,161, dated Mar. 31, 2021, 13 pages.
IEEE International Conference on Robotics and Automation Searches for robot vacuum, 2015, 3 pages.
Chinese Office Action issued in Chinese Application No. 2016800855242, dated Jul. 3, 2020, 15 pages.
Chinese Office Action issued in Chinese Application No. 2016800855242, dated May 25, 2021 with translation, 23 pages.
"SM51 Series Opposed Mode Sensors, DC sensors with metal housings: SM51EB/RB, SM51EB6/RB6", Banner Engineering Corporation, pp. 1-24.
Andersson, et al., "ISR: An Intelligent Service Robot", Centre for Autonomous Systems, Royal Institute of Technology, S-100 44 Stockholm, Sweden, pp. 1-24.
Berlin, et al. "Development of a Multipurpose Mobile Robot for Concrete Surface Processing", A Status Report, Feb. 1992, Sweden, pp. 1-10.
Borenstein, et al. "Real-Time Obstacle Avoidance for Fast Mobile Robots", IEEE, Jan. 6, 1996, pp. 1-18.
Braunstingl, et al., "Fuzzy Logic Wall Following of a Mobile Robot Based on the Concept of General Perception", ICAR '95, 7th International Conference on Advanced Robotics, Sant Feliu De Guixols, Spain pp. 367-376., Sep. 1995, pp. 1-9.
Caselli, et al. "Mobile Robot Navigation in Enclosed Large-Scale Space", Italy and U.S.A., pp. 1-5.
Cassens, et al. "Finishing and Maintaining Wood Floors", Wood Finishing, North Central Regional Extension Publication #136, pp. 1-8.
Chinese Office Action for Chinese Application No. 2014800837122, dated May 5, 2019 with translation, 20 pages.
Chinese Office Action for Application No. 201380081331.6, dated Mar. 26, 2018 with translation, 27 pages.
Chinese Office Action for Chinese Applciation No. 201380081537.9, dated Jun. 4, 2018 with translation, 15 pages.
Chinese Office Action for Chinese Application No. 20130075510.9, dated Feb. 6, 2017 with translation, 14 pages.
Chinese Office Action for Chinese Application No. 201380075503.9, dated Febraury 13, 2017 with translation, 18 pages.
Chinese Office Action for Chinese Application No. 201380075503.9, dated Nov. 8, 2017 with translation, 16 pages.
Chinese Office Action for Chinese Application No. 201380075510.9, dated Oct. 27, 2017 with translation, 13 pages.
Chinese Office Action for Chinese Application No. 201380081103.9, dated Feb. 27, 2018 with translation, 19 pages.
Chinese Office Action for Chinese Application No. 201380081103.9, dated Jun. 6, 2019 with translation, 10 pages.
Chinese Office Action for Chinese Application No. 201380081535.X, dated Jun. 12, 2019, 25 pages.
Chinese Office Action for Chinese Application No. 201380081535.X, dated Mar. 26, 2018, 18 pages.
Chinese Office Action for Chinese Application No. 201380081537.9, dated Jan. 30, 2019 with translation, 12 pages.

(56) References Cited

OTHER PUBLICATIONS

Chinese Office Action for Chinese Application No. 201480079515.3, dated Jun. 5, 2019, 9 pages.
Chinese Office Action for Chinese Application No. 201480083392.0, dated Jan. 3, 2020, 8 pages.
Chinese Office Action for Chinese Application No. 2014800837122, dated Jan. 7, 2020, 10 pages.
Chinese Office Action for Chinese Application No. 201480084065.7, dated Sep. 16, 2019 with translation, 16 pages.
Chinese Office Action for Chinese Application No. 2015800781846, dated Sep. 18, 2019 with translation, 15 pages.
Chung et al.,"Path Planning For A Mobile Robot With Grid Type World Model", Proceedings of the 1992 IEEE/RSJ International Conference on Intelligent Robots and Systems,Jul. 7-10, 1992, pp. 439-444.
Collins, et al. "Cerebellar Control of a Line Following Robot", Computer Science and Electrical Engineering Department, University of Queensland, St. Lucia, Queensland, 4072 A, pp. 1-6.
Decision for Refusal for Japanese Application No. 2016-526875, dated May 15, 2018 with translation, 6 pages.
Decision of Refusal for Japanese Application No. 2016-526945, dated May 7, 2017 with trasnslation, 5 pages.
Doty, et al. "Sweep Strategies for a Sensory-Driven, Behavior-Based Vacuum Cleaning Agent", 1993, Machine Intelligence Laboratory-Gainesville Florida, AAAI 1993 Fall Symposium Series—Research Triangle Park—Raleigh, NC, Oct. 22-24, 1993, pp. 1-6.
European Communication Pursuant to Article 94(3) for European Application No. 16176479.0, dated Nov. 27, 2017, 6 pages.
European Communication Pursuant to Article 94(3) for EP Application No. 13817911.4, dated Apr. 2, 2019, 8 pages.
European Communication Pursuant to Article 94(3) for European Application No. 15759442.5, dated Apr. 17, 2019, 6 pages.
Everett, Sensors For Mobile Robots Theory and Application, A.K. Peters, 1995, Chapters 1 and 3, 70 pages.
Everett, Sensors For Mobile Robots Theory and Application, A.K. Peters, Ltd., 1995, Chapters 15 and 16, 59 pages.
Everett, Sensors for Mobile Robots Theory and Application, A.K. Peters, Ltd., 1995, Chapters 6, 7 and 10, 79 pages.
Everett, Sensors For Mobile Robots Theory and Application, A.K. Peters, Ltd., 1995, Chapters, 4a nd 5, 68 pages.
Everett, et al. "Survey of Collision Avoidance and Ranging Sensors for Mobile Robots", Revision 1, Technical Report 1194, Dec. 1992, pp. 1-154.
Extended European Search Report for European Application No. 16176479.0, dated Nov. 11, 2016, 9 pages.
Extended European Search Report for European Application No. 18157403.9, dated Nov. 14, 2018, 12 pages.
Final Office Action for U.S. Appl. No. 14/409,291, dated Jun. 6, 2017, 21 pages.
Final Office Action for U.S. Appl. No. 14/784,106, dated Mar. 28, 2018, 8 pages.
Final Office Action for U.S. Appl. No. 15/100,667, dated Apr. 21, 2017, 26 pages.
Final Office Action for U.S. Appl. No. 15/100,667, dated Mar. 27, 2018, 23 pages.
Final Office Action for U.S. Appl. No. 15/101,212, dated Oct. 11, 2017, 7 pages.
Final Office Action for U.S. Appl. No. 15/101,510, dated Feb. 8, 2019, 16 pages.
Final Office Action for U.S. Appl. No. 15/102,017, dated Jun. 14, 201812 pages.
Final OFfice Action for U.S. Appl. No. 15/321,333, dated Apr. 18, 2019, 14 pages.
Final Office Action for U.S. Appl. No. 15/504,066, dated Mar. 21, 2019, 18 pages.
Final Office Action for U.S. Appl. No. 15/504,071, dated Dec. 4, 2019, 20 pages.
Final Office Action for U.S. Appl. No. 15/504,071, dated Mar. 5, 2019, 20 pages.
Final Office Action for U.S. Appl. No. 15/534,327, dated Jul. 26, 2019, 16 pages.
Final Office Action for U.S. Appl. No. 15/534,591, dated Dec. 2, 2019, 15 12 pages.
Final Office Action for U.S. Appl. No. 15/535,506, dated Sep. 17, 2019, 11 pages.
Final Office Action for U.S. Appl. No. 15/101,235, dated Jan. 11, 2018, 12 pages.
Gavrilut, et al., "Wall-Following Method for an Autonomous Mobile Robot using Two IR Sensors", 12th WSEAS International Conference on Systems, Heraklion, Greece, Jul. 22-24, 2008, ISBN: 978-960-6766-83-1, ISSN: 1790-2769, pp. 205-209.
Gutman et al., AMOS: Comparison of Scan Matching Approaches for Self-Localization in Indoor Environments, 1996, IEEE, pp. 61-67.
Herbst, et al., "Micromouse Design Specifications", Jun. 2, 1998, pp. 1-22.
International Preliminary Report on Patentability for International Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP2017/056100, dated Sep. 17, 2019, 6 pages.
International Preliminary Report on Patentability for International Application No. PCT/EP203/077380, dated Jun. 21, 2016, 6 pages.
International Search Report and Written Opinion of the Internatinal Searching Authoirty for International Application No. PCT/EP2016/055547, dated Jan. 2, 2017, 10 pages.
International Search Report and Written Opinion for International Application No. PCT/EP2017/056100, dated Dec. 18, 2017, 9 pages.
International Search Report and Written Opinion for International Application No. PCT/EP2017/063468, dated Mar. 1, 2018, 10 pages.
International Search Report and Written Opinion for International Application No. PCT/EP2017/072267, dated Jun. 6, 2018, 9 pages.
International Search Report and Written Opinion for International Application No. PCT/EP2017/074406, dated May 2, 2018, 9 pages.
International Search Report and Written Opinion of the International Searching Authoirty for International Application No. PCT/EP2015/040140, dated May 27, 2016, 11 pages.
International Search Report and Written Opinion of the International Searching Authority for International Application No. PCT/EP2015/058377, dated Aug. 10, 2016, 15 pages.
International Search Report and Written Opinion of the International Searching Authority for International Application No. PCT/EP2014/069073, dated May 12, 2015, 10 pages.
International Search Report and Written Opinion of the International Searching Authority for International Application No. PCT/EP2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.

(56) References Cited

OTHER PUBLICATIONS

International Search Report and Written Opinion of the International Searching Authority for International Application No. PCT/EP2013/077384, dated Aug. 14, 2016, 9 pages.
International Search Report and Written Opinion of the International Searching Authority for International Application No. PCT/EP2013/077385, dated May 27, 2015, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.
International Search Report and Written Opinion of the International Searching Authority for International Application No. PCT/EP2013/077661, dated Jun. 10, 2014, 15 pages.
International Search Report and Written Opinion of the International Searching Authority for International Application No. PCT/EP2014/069074, dated May 11, 2015, 9 pages.
International Search Report and Written Opinion of the International Searching Authority for International Application No. PCT/EP2014/077549, dated Jul. 27, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 19 pages.
International Search Report and Written Opinion of the International Searching Authority for International Application No. PCT/EP2014/078144, dated Apr. 15, 2015, 7 pages.
International Search Report and Written Opinion of the International Searching Authority for International Application No. PCT/EP2016/060565, dated Feb. 15, 2017, 12 pages.
International Search Report and Written Opinion of the International Searching Authority for International Application No. PCT/EP2016/060571, dated Feb. 7, 2017, 8 pages.
International Search Report and Written Opinion of the International Searching Authority for International Application No. PCT/EP2016/072291, dated Jun. 6, 2017, 11 pages.
International Search Report and Written Opinion of the International Searching Authority for International Application No. PCT/EP32013/077657, dated Aug. 18, 2014, 10 pages.
International Search Report and Written Opinion of the International Searching Authority for Internatonal Applicaion No. PCT/EP2014/0077142, dated Sep. 11, 2015, 8 pages.
International Search Report for International Application No. PCT/EP2013/057814 dated Dec. 20, 2013, 5 pages.
International Search Report for International Application No. PCT/EP2013/057815 dated Apr. 12, 2014, 4 pages.
International Search Report for International Application No. PCT/EP2013/067500 dated Dec. 10, 2013, 4 pages.
Japanese Notice of Reasons for Refusal for Japanese Application No. 2016-526947, dated Nov. 28, 2019 with translation, 4 pages.
Japanese Notice of Reasons for Refusal for Japanese Application No. 2017-522557, dated Jun. 18, 2019 with translation, 6 pages.
Japanese Office Action for Application for Japanese Application No. 2015-528969, dated Apr. 7, 2017 with translation, 4 pages.
Japanese Office Action for Japanese Application No. 2016-506794, dated Feb. 7, 2017 with translation, 10 pages.
Japanese Office Action for Japanese Application No. 2016-506795 , dated Feb. 7, 2017 with translation, 6 pages.
Japanese Report of Reconsideration by Examiner Before Appeal for Japanese Application No. 206-526947, dated Apr. 10, 2019 with translation, 3 pages.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to Implementation, Second Edition, A.K. Peters, Ltd., 1999, Chapters 1 and 5, 72pages.
Jones etal., Mobile Robots Inspiration to Implementation, Second Edition, A.K. Peters ,Ltd., 1999, Chapters 6 and 9, 56pages.
Jones etal., Mobile Robots Inspiration to Implementation, Second Edition, A.K. Peters, Ltd., 1999, Chapters 10 and 11, 45pages.
Jung, et al. "Whisker Based Mobile Robot Navigation", Wollongong, NSW 2500, Australia, pp. 1-8.
Korean Office Action for Korean Application No. 10-20157030949, dated Mar. 29, 2019, 5 pages.
Korean Office Action for Korean Application No. 10-2016-7015470, dated Sep. 30, 2019 with translation, 8 pages.
Korean Office Action for Korean Application No. 10-2016-7016792, dated Aug. 21, 2019, with translation, 10 pages.
Krishna, et al., "Solving the Local Minima Problem for a Mobile Robot by Classification of Spatio-Temporal Sensory Sequences", Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana,CA, pp. 1-8.
Maaref, et al."Sensor-based navigation of a mobile robot in an indoor environment", Robotics and Autonomous Systems, 2002, Elsevier, 18pages.
Michael Carsten Bosse, "Atlas: A Framework for Large Scale Automated Mapping and Localization", Massachusetts Institute of Technology, Feb. 2004, Part 2, 67 pages.
Michael Carsten Bosse, "Atlas: A Framework for Large Scale Automated Mapping and Localization", Massachusetts Institute of Technology, Feb. 2004, Part 1, 140 pages.
Non Final Office Action for U.S. Appl. No. 14/409,291, dated Dec. 28, 2016, 61 pages.
Non Final Office Action for U.S. Appl. No. 15/101,235, dated Nov. 1, 2017, 11 pages.
Non Final Office Action for U.S. Appl. No. 15/535,506, dated May 1, 2019, 16 pages.
Non Final Office Action for U.S. Appl. No. 14/784,106, dated Oct. 19, 2017, 11 pages.
Non Final Office Action for U.S. Appl. No. 14/784,110, dated Aug. 16, 2018, 13 pages.
Non Final Office Action for U.S. Appl. No. 15/100,667, dated Nov. 29, 2017, 22 pages.
Non Final Office Action for U.S. Appl. No. 15/100,667, dated Sep. 12, 2016, 24 pages.
Non Final Office Action for U.S. Appl. No. 15/101,212, dated May 17, 2017, 8 pages.
Non Final Office Action for U.S. Appl. No. 15/101,235 dated Apr. 21, 2017, 10 pages.
Non Final Office Action for U.S. Appl. No. 15/101,235, dated Jun. 14, 2018, 11 pages.
Non Final Office Action for U.S. Appl. No. 15/101,235, dated Sep. 6, 2019, 10 pages.
Non Final Office Action for U.S. Appl. No. 15/101,257, dated Feb. 10, 2017, 10 pages.
Non Final Office Action for U.S. Appl. No. 15/101,510, dated Jul. 27, 2018, 17 pages.
Non Final Office Action for U.S. Appl. No. 15/101,515, dated Apr. 18, 2018, 14 pages.
Non Final Office Action for U.S. Appl. No. 15/102,015, dated Aug. 17, 2017, 13 pages.
Non Final Office Action for U.S. Appl. No. 15/102,017, dated Feb. 16, 2018, 12 pages.
Non Final Office Action for U.S. Appl. No. 15/102,017, dated Jan. 22, 2 019, 15 pages.
Non Final Office Action for U.S. Appl. No. 15/321,333, dated Oct. 24, 2018, 10 pages.
Non Final Office Action for U.S. Appl. No. 15/504,066, dated Nov. 5, 2018, 18 pages.
Non Final Office Action for U.S. Appl. No. 15/504,071, dated Aug. 8, 2019, 23 pages.

(56) References Cited

OTHER PUBLICATIONS

Non Final Office Action for U.S. Appl. No. 15/504,071, dated Nov. 2, 2018, 17 pages.
Non Final Office Action for U.S. Appl. No. 15/534,327, dated Mar. 7, 2019, 11 pages.
Non Final Office Action for U.S. Appl. No. 15/534,591, dated Aug. 9, 2019, 11 pages.
Non Final Office Action for U.S. Appl. No. 15/535,244, dated May 17, 2019, 6 pages.
Non Final Office Action for U.S. Appl. No. 15/565,467, dated Jan. 29, 2020, 12 pages.
Notice of Allowance for U.S. Appl. No. 15/100,667, dated Aug. 6, 2018, 22 pages.
Notice of Allowance for U.S. Appl. No. 14/409,291, dated Jun. 16, 2016, 13 pages.
Notice of Allowance for U.S. Appl. No. 14/409,291, dated Sep. 18, 2017, 8 pages.
Notice of Allowance for U.S. Appl. No. 14/784,106, dated Oct. 11, 2018, 7 pages.
Notice of Allowance for U.S. Appl. No. 15/101,212I dated Apr. 11, 2018, 9 pages.
Notice of Allowance for U.S. Appl. No. 15/101,235, dated Dec. 12, 2019, 8 pages.
Notice of Allowance for U.S. Appl. No. 15/101,257, dated Jul. 6, 2017, 9 pages.
Notice of Allowance for U.S. Appl. No. 15/101,510, dated May 30, 2019, 12 pages.
Notice of Allowance for U.S. Appl. No. 15/101,515, dated Aug. 28, 2018, 11 pages.
Notice of Allowance for U.S. Appl. No. 15/102,015, dated Dec. 11, 2017, 8 pages.
Notice of Allowance for U.S. Appl. No. 15/102,295, dated Sep. 24, 2018, 9 pages.
Notice of Allowance for U.S. Appl. No. 15/504,066, dated Aug. 9, 2019.
Notice of Allowance for U.S. Appl. No. 15/535,244, dated Sep. 10, 2019, 5 pages.
Notice of Reasons for Rejection for Japanese Application No. 2016-526756, dated Aug. 10, 2017, with translation, 6 pages.
Notice of Reasons for Rejection for Japanese Application No. 2016-526759, dated Aug. 24, 2017 with translation, 9 pages.
Notice of Reasons for Rejection for Japanese Application No. 2016-526765, dated Aug. 25, 2017 with translation, 7 pages.
Notice of Reasons for Rejection of Japanese Application No. 2016-526764, dated Aug. 25, 2017 with translation. 6 pages.
Notification for Reasons for Refusal for Japanese Application No. 2016-526875, dated Oct. 31, 2017 with translation, 10 pages. .
Notification of Reasons for Refusal for Japanese Application No. 2016-526765, dated May 15, 2018 with translation, 6 pages.
Notification of Reasons for Refusal for Japanese Application No. 2016-526945, dated Oct. 31, 2017 with translation, 8 pages.
Notification of Reasons for Refusal for Japanese Application No. 2016-568949, dated Oct. 9, 2018 with translation, 6 pages.
Notification of Reasons for Refusal for Japanese Application No. 2017-501374, dated Mar. 6, 2016 with translation, 8 pages.
Notification of Reasons for Refusal for Japanese Application No. 2017-544589, dated Apr. 2, 2019 with translation, 6 pages.
Notification of Reasons for Rejection for Japanese Application No. 2016-526947, dated Sep. 21, 2017 with translation,, 8 pages.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.
Position_Definition of Position by Merriam-Webster.pdf (Position | Definition of Position by Merriam-Webster, Oct. 16, 2016, Merriam-Webster, https://www.merriam-webster.com/dictinary/position, pp. 1-15).
Report of Reconsideration for Japanese Application No. 2016-011556, dated Oct. 24, 2018, 2 pages.
Saffiotti, "Fuzzy logic in Autonomous Robot Navigation", a case study, Nov. 1995 Revised: Aug. 1997, IRIDIA, Universite Libre de Bruxelles, Belgium, , Technical Report TR/IRIDIA/ 95 25, Cover page + pp. 1-14.
Written Opinion for International Application No. PCT/EP2013/067500 dated Dec. 10, 2013, 7 pages.
Yamamoto, "SOZZY: A Hormone-Driven Autonomous Vacuum Cleaner", From: AAAI Technical Report FS-93-03, Matasushita Research Institute, Tokyo, and MIT Artificial Intelligence laboratory, Massachusetts, pp. 116-124 + Figure 9 and Figure 11.
Yoshida et al., "Online Motion Planning Using Path Deformation and Replanning", 28th Annual Robot Society, with partial translation, 2011, vol. 29, No. 8, Chapter 3, pp. 716-725.
Chinese Office Action issued in Chinese Patent Application No. 2017800875876, dated Jan. 6, 2021, 12 pages.
USPTO Non Final Office Action issued in U.S. Appl. No. 16/491,355, dated Apr. 16, 2021, 14 pages.
Korean Office Action issued in Korean Patent Application No. 10-2019-7025893, dated Apr. 28, 2021, 10 pages.
USPTO Notice of Allowance issued in U.S. Appl. No. 15/565,467, dated Sep. 22, 2020, 6 pages.
Korean Office Action for Korean Application No. 10-2019-7034477, dated Aug. 23, 2021 with translation, 14 pages.
USPTO Non Final Office Action issued in U.S. Appl. No. 16/083,161, dated Oct. 27, 2020, 13 pages.
Bagnell et al., "Learning for Autonomous Navigation", IEEE Robotics Automation Magazine, 2010, abtract only, 1 page.
Ellis et al., "Autonomous Navigation and Sign Detector Learning", IEEE Workshop on Robot Vision (WORV), 2013, abstract only, 1 page.
Pontil et al., "Support Vector Machines for 3D Object. Recognition", IEEE Transactions on Pattern Analysis and Machine Intelligence, 1008, vol. 20, No. 6, abstract only, 1 page.
Zuo et al., "A Reinforcement Learning Based Robotic Navigation System", 2014 IEEE International Conference on Systems, Man, and Cybernetics, 2014, abstract only, 1 page.
USPTO Notice of Allowance issued in U.S. Appl. No. 16/083,161, dated Jul. 9, 2021, 9 pages.
USPTO Final Office Action issued in U.S. Appl. No. 15/565,467, dated Jun. 2, 2020, 8 pages.
Chinese Office Action for Chinese Application No. 2015800781846, dated Mar. 24, 2020, 9 pages.
Chinese Office Action for Chinese Application No. 201680085524.2, dated Nov. 29, 2021 with translation, 14 pages.
USPTO Non Final Office Action for U.S. Appl. No. 16/099,780, dated Jun. 27, 2022, 19 pages.

\* cited by examiner

METHOD OF DETECTING A DIFFERENCE IN LEVEL OF A SURFACE IN FRONT OF A ROBOTIC CLEANING DEVICE

This application is a U.S. National Phase application of PCT International Application No. PCT/EP2017/063468, filed Jun. 2, 2017, which is incorporated by reference herein.

TECHNICAL FIELD

The invention relates to a method of detecting a difference in level of a surface in front of a robotic cleaning device, and a robotic cleaning device performing the method.

Further provided is a computer program comprising computer-executable instructions for causing a robotic cleaning device to perform the steps of the method when the computer-executable instructions are executed on a controller included in the robotic cleaning device.

Yet further provided is a computer program product comprising a computer readable medium, the computer readable medium having the computer program embodied thereon.

BACKGROUND

In many fields of technology, it is desirable to use robots with an autonomous behaviour such that they freely can move around a space without colliding with possible obstacles. Robotic vacuum cleaners are known in the art, which are equipped with drive means in the form of a motor for moving the cleaner across a surface to be cleaned. The robotic vacuum cleaners are further equipped with intelligence in the form of microprocessor(s) and navigation means for causing an autonomous behaviour such that the robotic vacuum cleaners freely can move around and clean a surface in the form of e.g. a floor. Thus, these prior art robotic vacuum cleaners have the capability of more or less autonomously vacuum clean a room in which objects such as tables and chairs and other obstacles such as walls and stairs are located.

A problem with prior art robotic vacuum cleaners is that they tend to get stuck to on obstacles such as doorsteps or thick rugs A particularly problematic obstacle encountered is a ledge, typically in the form of a stair leading down to a lower floor. If such a ledge is not detected by the robotic cleaner, there is a risk that the robot drops off the ledge, falls down the stair and becomes permanently damaged.

SUMMARY

An object of the present invention is to solve, or at least mitigate, this problem in the art and to provide and improved method of detecting a difference in level of a surface in front of the robotic cleaning device.

This object is attained in a first aspect of the invention by a method for a robotic cleaning device of detecting a difference in level of a surface in front of the robotic cleaning device. The method comprises illuminating the surface with light, capturing an image of the surface, detecting a luminous section in the captured image caused by the light, identifying at least a first segment and a second segment representing the detected luminous section, and detecting, from a positional relationship between the identified first and second segment, the difference in level of the surface.

This object is attained in a second aspect of the invention by a robotic cleaning device configured to detect a difference in level of a surface in front of the robotic cleaning device. The robotic cleaning device comprises a propulsion system configured to move the robotic cleaning device, a camera device configured to record images of a vicinity of the robotic cleaning device, and at least one light source configured to illuminate a surface in front of the robotic cleaning device. The robotic cleaning device further comprises a controller configured to control the at least one light source to illuminate a surface in front of the robotic cleaning device, control the camera device to capture an image of the illuminated surface, detect a luminous section in the captured image caused by the at least one light source illuminating the surface, identify at least a first segment and a second segment representing the detected luminous section, and to detect, from a positional relationship between the identified first and second segment, the difference in level of the surface.

Advantageously, by measuring a difference in level of the surface in front of the robotic device, it is possible to timely plan how the robotic device should move for performing a cleaning programme—well before an object or surface is encountered—and further to be able avoid traversing an object such as for example a doorstep, the height of which may be to great for the robotic device to traverse.

Further advantageous is that by detecting height of objects or surfaces in front of the robotic cleaning device, for instance a thick rug, the robot may be controlled to move along the periphery of the rug thereby making efficient use of any side brushes with which the robot may be equipped. After having cleaned along the periphery of the rug, the robotic cleaning device may move up onto the rug, where it typically would refrain from using the side brush. Instead, the robot could alternately rotate a rotatable brush roll, with which the robot may be equipped, in a forward and backward direction to avoid having the fibers of the rug being entangled in the brush roll. Hence, the movement of any brush roll and any side brush(es) can advantageously be controlled by taking into account the determined height of the surfaces and objects in front of the robotic cleaning device.

In an embodiment, the robotic device detects that a discontinuity occurs between the identified first and second segment in the captured image, wherein the difference in level is detected to comprise a ledge.

In this embodiment, which advantageously can be implemented for less complex robotic devices, the difference in level of the floor in front of the robotic device is detected by concluding from the captured image that the first and second segment are discontinuous.

If such a discontinuity occurs, the robotic cleaning device concludes in one embodiment that a floor on a distance in front of the robotic cleaning device is located at a lower level than a floor immediately in front of the robotic cleaning device. However, if such a method is used, the robotic device only knows that there is difference in level, but cannot assess a height of the difference in level.

In another embodiment, the robotic device determines if the second segment is located vertically below the first segment in the captured image, in which case the difference in level constitutes a ledge.

In a further embodiment, which advantageously can be implemented for less complex robotic devices, the difference in level of the floor in front of the robotic device is detected by concluding from the image that the first and second segment are linked by a third segment.

If such a linking segment between the first and the second segment is present in the captured image, the robotic device concludes that the floor on a distance from the robotic cleaning device is located on a higher level than a floor immediately in front of the robotic cleaning device. Hence, an elevation has been encountered.

In another embodiment, the robotic device determines if the second segment is located vertically above the first segment, in which case the difference in level constitutes an elevation.

In yet an embodiment, the robotic device determines a distance to e.g. a ledge and a height of the ledge.

Thus, a more elaborate robotic cleaning device can determine, from x and y image coordinates, the distance to the ledge and the height of the ledge, by converting image coordinates to actual real-world distances.

This information may advantageously be used for sectionalizing an area to be cleaned. For instance, the robotic device may determine that it should finish cleaning the room in which it currently is located before moving on to the next room, i.e. before descending the ledge down to a lower floor.

It may further be envisaged that the robotic device does not descend the ledge at all after having determined its height. Assuming for instance that the height of the ledge exceeds a predetermined level threshold value; this indicates that the ledge is followed by a stairway in which case the robotic device is controlled not the cross the ledge to avoid the robot falling over.

Further provided is a computer program comprising computer-executable instructions for causing a robotic cleaning device to perform the steps of the method when the computer-executable instructions are executed on a controller included in the robotic cleaning device.

Yet further provided is a computer program product comprising a computer readable medium, the computer readable medium having the computer program embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The invention relates to robotic cleaning devices, or in other words, to automatic, self-propelled machines for cleaning a surface, e.g. a robotic vacuum cleaner, a robotic sweeper or a robotic floor washer. The robotic cleaning device according to the invention can be mains-operated and have a cord, be battery-operated or use any other kind of suitable energy source, for example solar energy.

Figure 1:
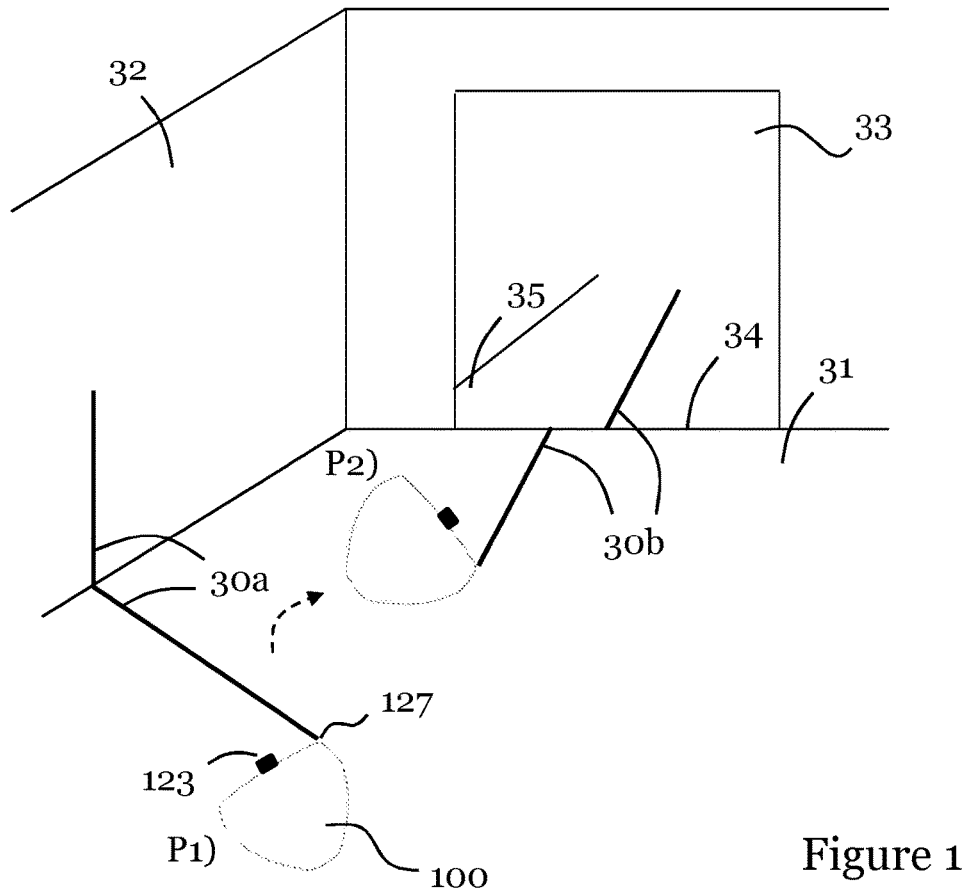
FIG. 1 illustrates detection of objects on a surface over which the robotic cleaning device moves in accordance with an embodiment of the present invention.

FIG. 1 illustrates detection of objects on a surface over which the robotic cleaning device moves in accordance with an embodiment of the present invention.

In this particular exemplifying embodiment, the robotic device 100 uses one vertical line laser 127 for illuminating the surface (i.e. floor 31) over which it moves. However, any appropriate light source may be envisaged for illuminating the surface 31. Further, a smaller or greater part of the surface may be illuminated.

As can be seen in FIG. 1, the line laser 127 projects a laser beam 30a onto the floor 31 and a first wall 32 of a room to be cleaned, while the robotic device 100 uses its camera 123 to capture images of the illuminated surface.

Figure 2A:
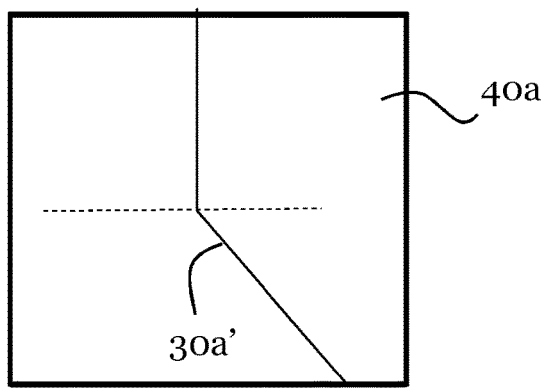
FIG. 2a illustrates an image captured by the camera of the robotic cleaning device when in position P1 of FIG. 1 according to an embodiment.

FIG. 2a illustrates an image 40a captured by the camera 123 of the robotic device 100 when in first position P1.

As can be seen, the laser beam 30a will fall onto the floor 31 and the wall 32 and cause corresponding illuminated section 30a' to be present in the image. The location in the image 40a where the floor 31 meets the wall 32 is indicated with a dashed line only for illustrational purposes; the dashed line is not present in the captured image 40a. From the captured image 40a, the robotic device 100 detects that the laser beam 30a impinges on an obstacle 32, such as a wall, a sofa, a door or the like. By capturing a number of images, the robotic device 100 is capable of identifying the particular obstacle 32 with high reliability. In case a different type of light source would be used, it may even be envisaged that the illuminated section covers the entire captured image. An advantage of using the laser beam as exemplified in FIG. 1 is that a less amount of image data needs to be processed by the robotic device 100.

As is illustrated in the image 40a, since the surface over which the robotic cleaning device 100 moves when in the first position P1 is a flat and even floor 31 and thus no difference in level is present, the illuminated section 30a' caused by the laser line 30a illuminating the floor 31 is composed of a single segment in the image 40a.

Figure 2B:
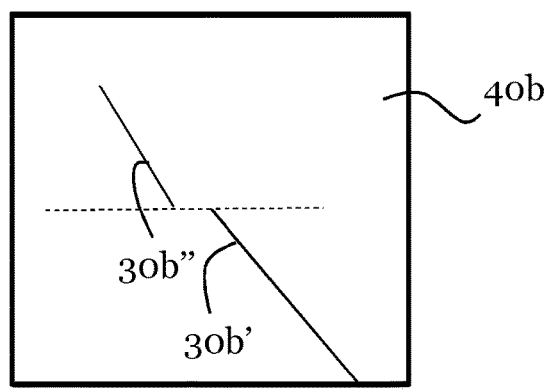
FIG. 2b illustrates an image captured by the camera of the robotic cleaning device when in position P2 of FIG. 1 according to an embodiment.

Now, again with reference to FIG. 1, when the robotic cleaning device 100 moves into a second position P2, it encounters a doorway 33 where a step leads down to a lower floor 35. Again, the robotic device 100 captures an image of the illuminated surface. FIG. 2b illustrates the image 40b captured by the camera 123 of the robotic device 100 when in the second position P2.

In this image, the laser beam 30b will fall onto the (upper) floor 31 and ledge 34 indicated with a dashed line in the image 40b for illustrational purposes. Further, the part of the laser beam 30b falling beyond the ledge 34 will incide on the lower floor 35, which is indicated in the image 40b as two line segments; a first segment 30b' falling onto the upper floor 31 and a second segment 30b" falling on the lower floor 35.

Figure 2C:
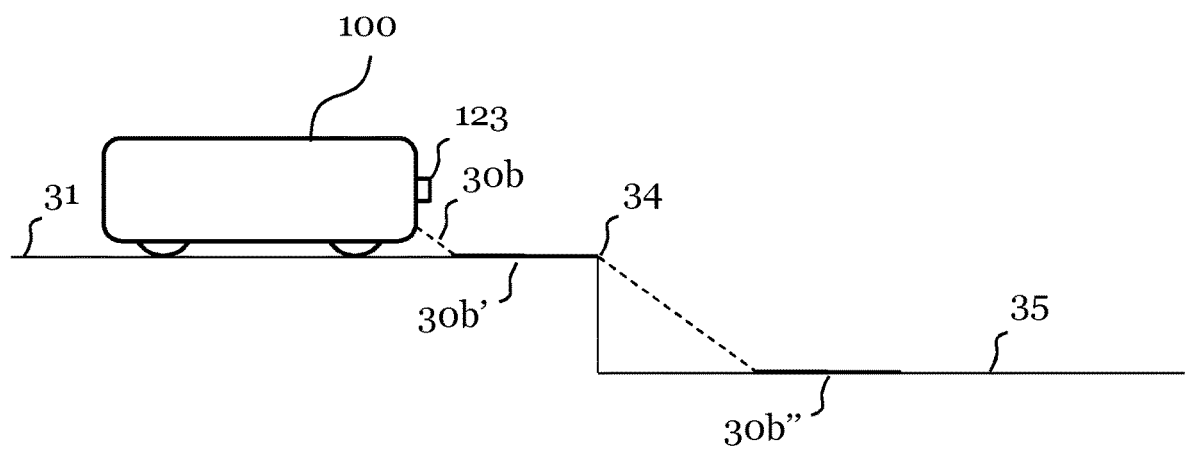
FIG. 2c illustrates a side view of the robotic cleaning device of FIG. 1 when in position P2.

For illustration, FIG. 2c shows a side view of the robotic device 100 when in position P2, where the laser beam 30a falls onto the upper floor 31, over the ledge 34, and onto the lower floor 35, where the ledge causes a shadow; i.e. the section of the lower floor 35 obscured by the ledge 34 will not be illuminated. The first line segment 30b' and second line segment 30b" that will appear in the captured image 40b are further indicated in FIG. 2c.

Figure 3:
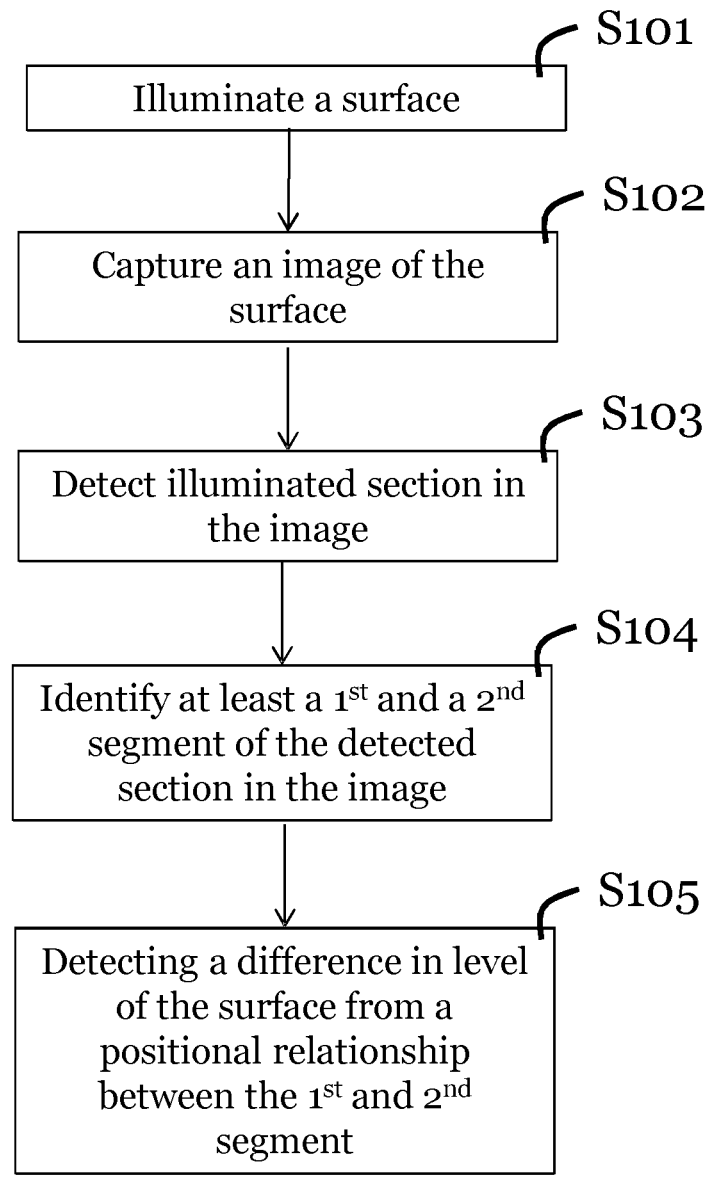
FIG. 3 shows a flowchart illustrating an embodiment of a method of detecting a difference in level of a surface over which the robotic cleaning device moves.

Hence, with reference to the flowchart of FIG. 3, a method of detecting a difference in level of a surface in front of the robotic cleaning device 100.

As was discussed, the robotic device 100 illuminates in step S101 the surface 31 in front of it with light, in this exemplifying embodiment with structured vertical light using the line laser 127, and captures images of the surface using the camera 123.

When the robotic device 100 is in position P2 as shown in FIG. 1, the captured image will have the appearance of image 40b illustrated in FIG. 2b.

From the captured image 40b, the robotic device 100 detects in step S103 a luminous section caused by the emitted laser line 30b, and identifies the first segment 30b' and the second segment 30b" representing the detected luminous section.

Now, after having identified the two segments 30b', 30b" in step S103, the robotic device 100 detects in step S104, from a positional relationship between the identified first and second segment 30b', 30b", a difference in level of the surface 31.

Advantageously, by measuring a difference in level of the surface in front of the robotic device 100, it is possible to timely plan how the robotic device 100 should move for performing a cleaning programme—well before an object or surface is encountered—and further to be able avoid traversing an object such as for example a doorstep, the height of which may be to great for the robotic device 100 to traverse.

In a basic embodiment, which advantageously can be implemented for less complex robotic devices, the difference in level of the floor 31 over which the robotic device 100 moves is detected by concluding from the 2D image 40b that the first and second segment 30b', 30b' are discontinuous.

If such a discontinuity occurs, the robotic device 100 concludes that the (lower) floor 35 is located at a lower level than the (upper) floor 31. However, if such a method is used, the robotic device 100 only knows that there is difference in level, but cannot assess a height of the difference in level.

In another embodiment, the robotic device 100 determines if the second segment 30b" is located vertically below the first segment 30b' in which case the difference in level constitutes a ledge.

Figure 4A:
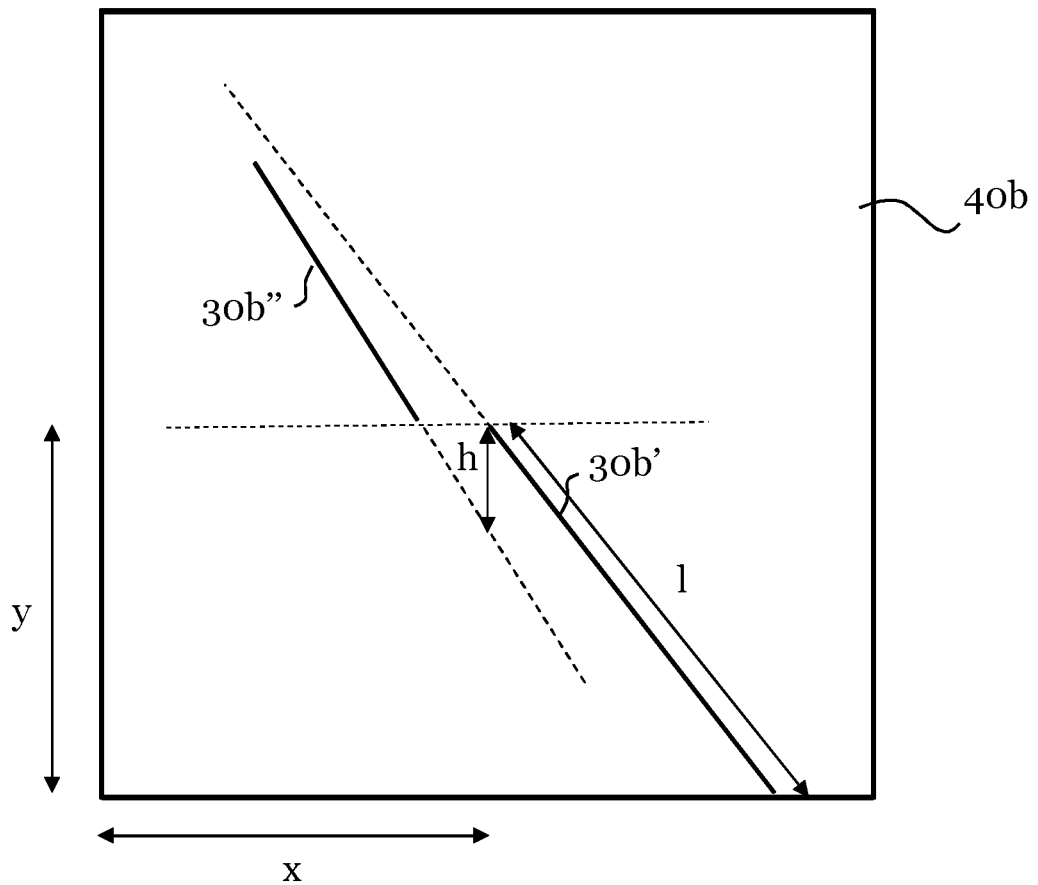
FIG. 4a illustrates an enlarged view of the captured image of FIG. 2b.

In a further embodiment, with reference to FIG. 4a illustrating an enlarged view of the captured image 40b of FIG. 2b, the robotic device 100 determines a distance l to the ledge 34 and a height h of the ledge 34, the height h being determined as being the vertical distance between the identified first and second segment 30b', 30b".

Thus, a more elaborate robotic cleaning device 100 can determine, from x and y image coordinates, the distance l to the ledge and the height h of the ledge, by converting image coordinates to actual real-world distances. Advantageously, the robotic device 100 will know the distance l to the ledge 34, as well as the height h of the ledge 34.

This information may further advantageously be used for sectionalizing an area to be cleaned. For instance, the robotic device 100 may determine that it should finish cleaning the room in which it currently is located before moving on to the next room, i.e. before descending the ledge 34 down to the lower floor 35.

It may further be envisaged that the robotic device 100 does not descend the ledge 34 after having determined its height h. Assuming for instance that the height h of the ledge 34 exceeds a predetermined level threshold value; this indicate that the ledge 34 is followed by a stairway in which case the robotic device 100 is controlled not the cross the ledge 34 to avoid the robot falling over.

Figure 4B:
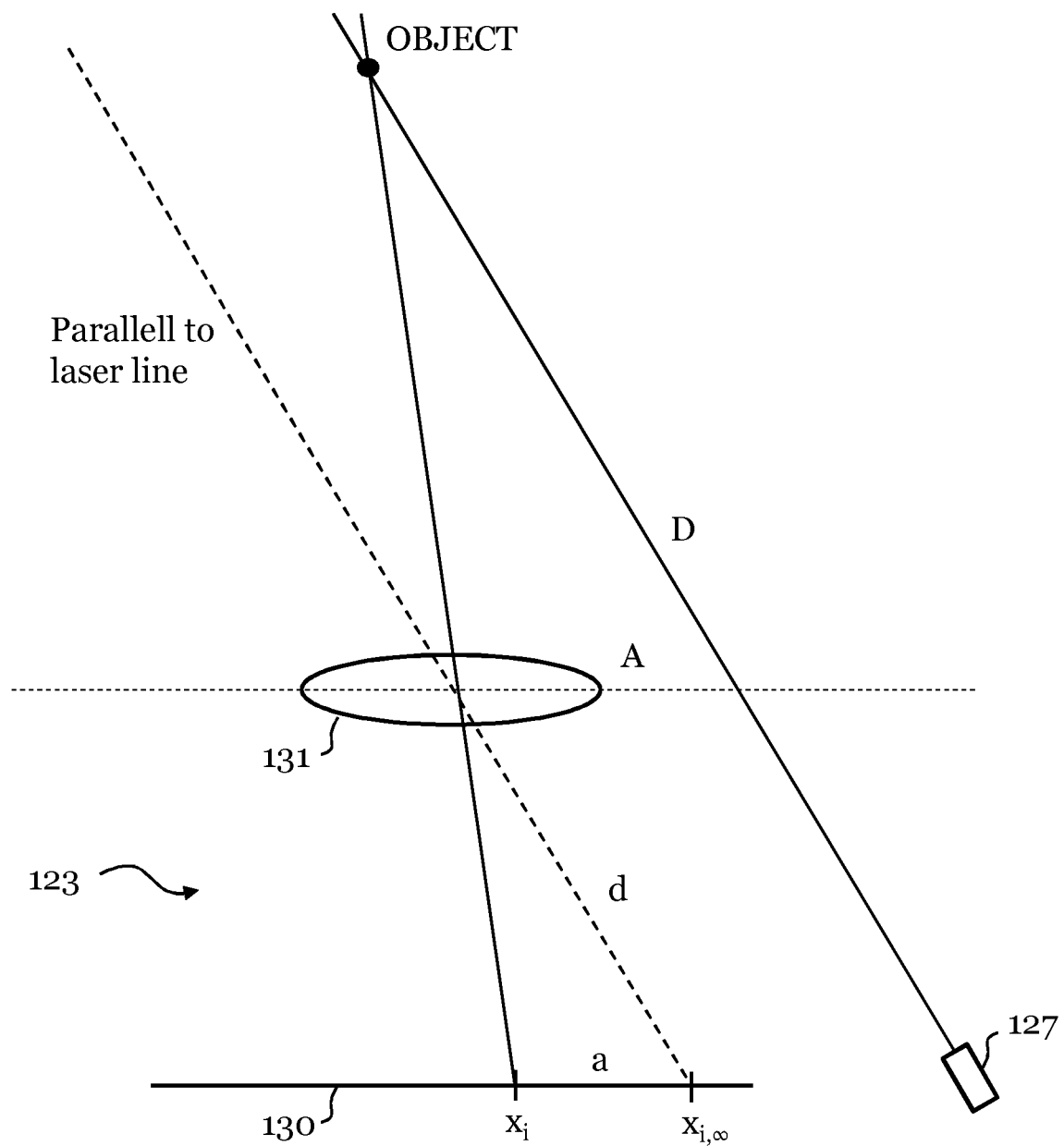
FIG. 4b illustrates computing distance to an encountered object according to an embodiment.

FIG. 4b illustrates in more detail how the robotic device 100 computes distance to a point referred to as "OBJECT".

The point is illuminated by the laser 127 in order for the camera 123 to see the point. An image coordinate of the point (measured in pixels) will be denoted $x_i$ on a sensor 130 of the camera 123, the sensor 130 being arranged behind an appropriate lens 131.

During manufacturing of the robotic cleaning device 100, a calibration is performed as to where on the camera sensor 130 the laser line would impinge if the camera 123 was to observe an object located on an infinite distance from the camera 123, the corresponding coordinate being denoted $x_{i,\infty}$.

From this information, the following can be deducted:

$$\frac{D}{A} = \frac{d}{a} = \frac{d}{x_{i,\infty} - x_i} \Rightarrow D = \frac{dA}{x_{i,\infty} - x_i}$$

It is noted that this relation is inversely proportional, meaning that the measurements become more sensitive over longer distances to the object. Hence, the distance D to a given point can be computed.

Figure 4C:
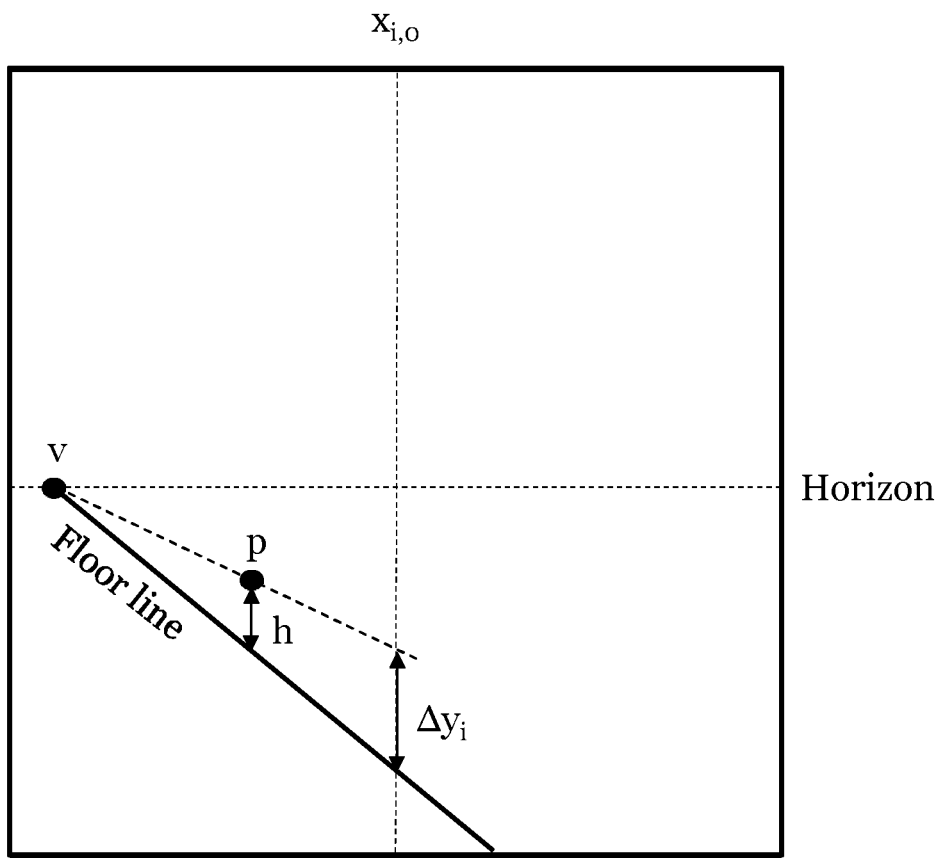
FIG. 4c illustrates computing height of an encountered object according to an embodiment.

FIG. 4c illustrates how the height of an object can be computed using the teachings of FIG. 4b.

Lines that are parallel in the "real" world will intersect in one and the same point v in an image, known as the vanishing point. If a point p located on a height h above the floor over which the robot 100 moves is illuminated by the laser 123, a dotted line can be drawn through the point p and the vanishing point v. This dotted line is parallel to the floor in the real world.

An x-coordinate $x_{i,o}$ can be selected in the image where the height $\Delta y_i$ of the dotted line over the floor is measured. If the height $\Delta y_i$ of the dotted line in the image always is measured at the same coordinate $x_{i,o}$ (or at least close to that coordinate) a proportional factor k can be calibrated (typically in units of m/pixel) to compute the height h in the real world:

$$h = k \times \Delta y_i$$

Figure 5:
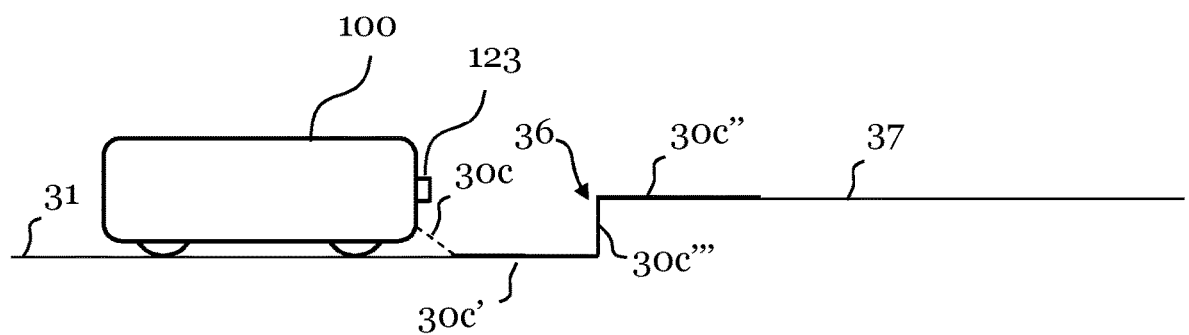
FIG. 5 illustrates a side view of the robotic cleaning device encountering an elevation.

FIG. 5 illustrates another scenario where the robotic device 100 encounters an elevation 36 instead of a ledge. For instance, it may be envisaged that the robotic device 100 encounters a thick rug, which may have a height of several centimetres, or a doorstep.

Figure 6:
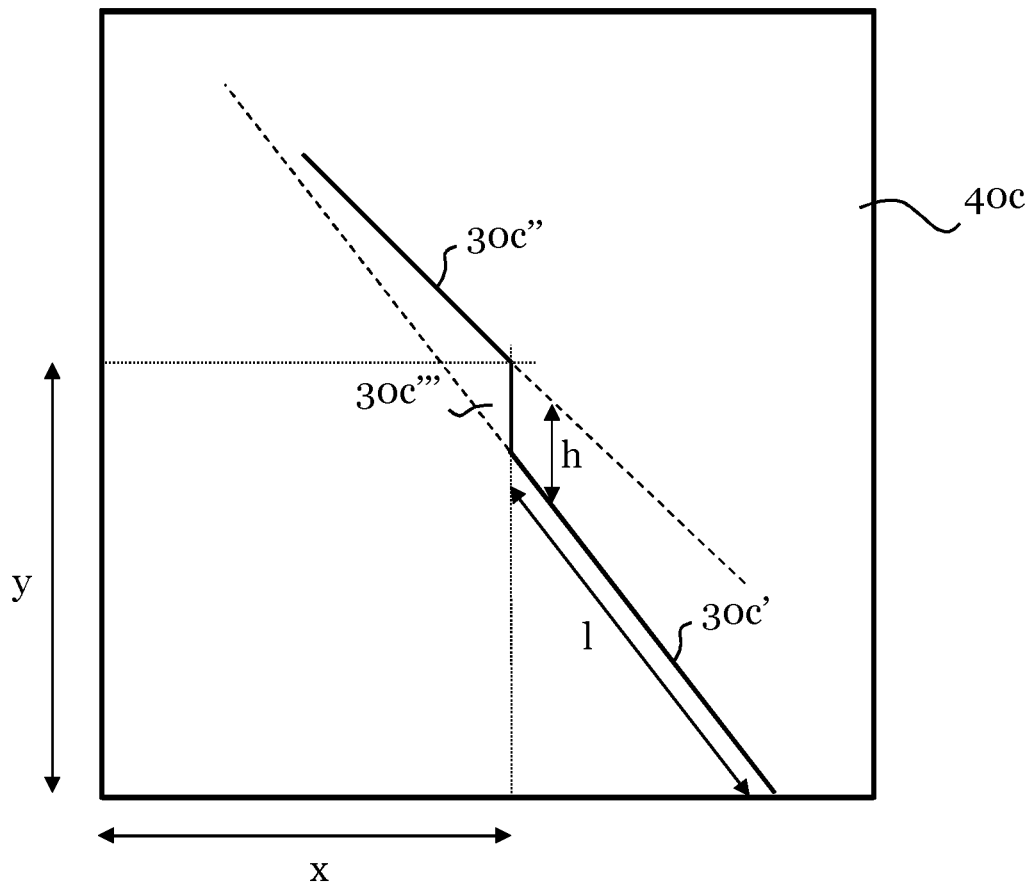
FIG. 6 illustrates an image captured by the robotic cleaning device in the position shown in FIG. 5.

FIG. 6 illustrates the image 40c captured by the camera 123 of the robotic device 100 upon encountering the elevation 37.

In this image, the laser beam 30c will fall onto the floor 31 in front of the robotic device 100 and further onto the edge of the rug causing the elevation 36 and the upper side 37 or the rug. This will result in three segments 30c', 30c" and 30c''' visible in the captured image 40c.

From the captured image 40c of FIG. 6, the robotic device 100 again detects a luminous section caused by the emitted laser line 30c, and identifies the first segment 30c', the second segment 30c", and a further a third segment 30c''' linking the first and second segments, which represents the detected luminous section.

Now, after having identified the first and the second segment 30c', 30c", the robotic device 100 detects, from a positional relationship between the identified first and second segment 30c', 30c", a difference in level of the surface 31.

In a basic embodiment, which advantageously can be implemented for less complex robotic devices, the difference in level of the floor 31 over which the robotic device 100 moves is detected by concluding from the 2D image 40b that the first and second segment 30c', 30c" are linked by a third segment 30c'''

If such a linking segment 30c''' between the first and the second segment 30c', 30c" is present in the captured image 40c, the robotic device 100 concludes that the (upper) side 37 of the rug is located at a higher level than the floor 31. However, if such a method is used, the robotic device 100 only knows that there is difference in level, but cannot assess an actual height.

In another embodiment, the robotic device 100 determines if the second segment 30c" is located vertically above the first segment 30c' in which case the difference in level constitutes an elevation.

In a further embodiment, again with reference to FIG. 6, the robotic device 100 determines a distance l to the elevation 36 and a height h of the elevation 36, as has been described hereinabove.

This information may advantageously be used for sectionalizing an area to be cleaned. For instance, the robotic device 100 may determine that it should finish cleaning the floor of the room in which it currently is located before moving up on the rug. Alternatively, in case the elevation is caused by a doorstep, the robotic device 100 may determine that the room is to be finished before it crosses the doorstep into the next room.

It may further be envisaged that the robotic device 100 does not ascend the rug/doorstep at all after having determined its height h. Assuming for instance that the height h of an elevation exceeds a predetermined level threshold value; this may indicate that e.g. a doorstep is too high to ascend in order to avoid having the robot being stuck on the doorstep.

The camera 123 of the robotic cleaning device 100 is controlled by a controller such as a microprocessor to capture and record images from which the controller creates a representation or layout of the surroundings that the robotic cleaning device 100 is operating in, by extracting feature points from the images representing detected objects and by measuring the distance from the robotic cleaning device 100 to these objects, as well as the heights of the objects using the method of the invention as has been discussed. while the robotic cleaning device 100 is moving across the surface to be cleaned. Thus, the controller derives positional data of the robotic cleaning device 100 with respect to the surface to be cleaned from the detected objects of the recorded images, generates a 3D representation of the surroundings from the derived positional data and controls driving motors to move the robotic cleaning device 100 across the surface to be cleaned in accordance with the generated 3D representation and navigation information supplied to the robotic cleaning device 100 such that the surface to be cleaned can be autonomously navigated by taking into account the generated 3D representation. Since the derived positional data will serve as a foundation for the navigation of the robotic cleaning device, it is important that the positioning is correct; the robotic device will otherwise navigate according to a "map" of its surroundings that is misleading.

The 3D representation generated from the images recorded by the camera 123 thus facilitates detection of obstacles in the form of walls, floor lamps, table legs, around which the robotic cleaning device must navigate as well as rugs, carpets, doorsteps, etc., that the robotic cleaning device 100 must traverse. The robotic cleaning device 100 is hence configured to learn about its environment or surroundings by operating/cleaning.

The robotic cleaning device 100 may advantageously add indications of detected ledges and elevations to the created representation of its surroundings. Thus, by adding to the created representation an indication of e.g. the ledge 34, it is possible for the robotic cleaning device to plan a cleaning path to be traversed well in advance and further to move very close to, and along, the ledge 34 since it is included in the representation of the surroundings of the robotic cleaning device 100.

Figure 7:
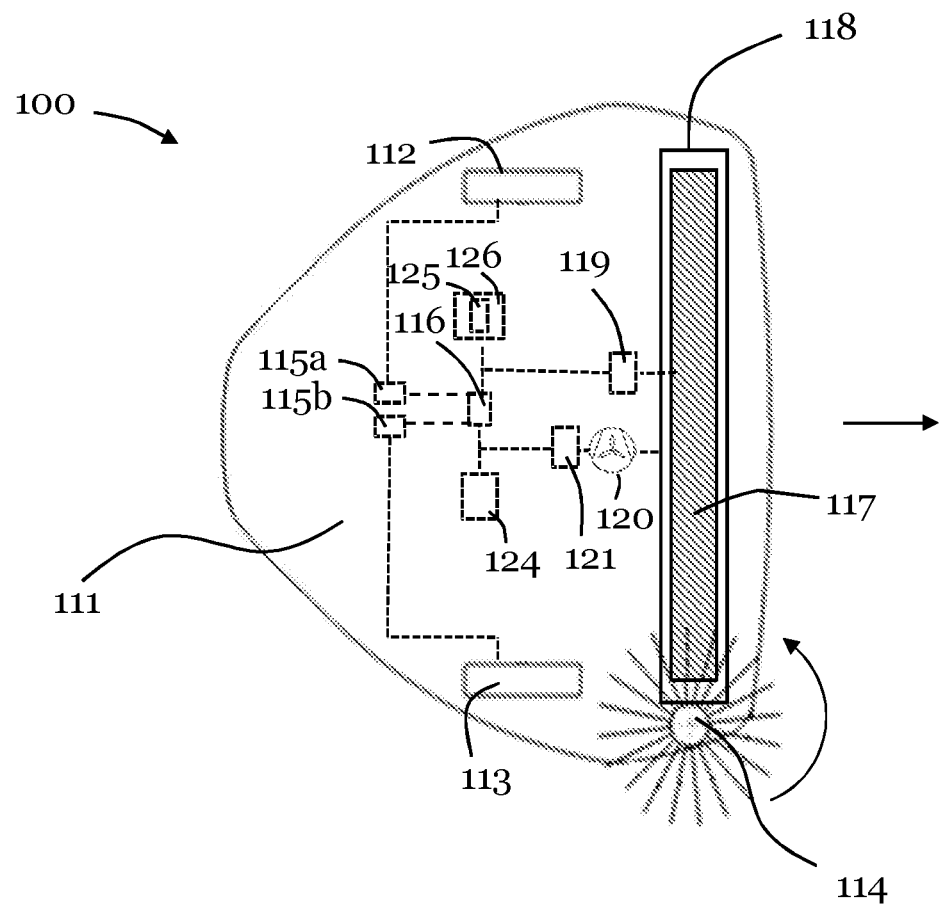
FIG. 7 shows a bottom view of a robotic cleaning device according to an embodiment.

Even though it is envisaged that the invention may be performed by a variety of appropriate robotic cleaning devices being equipped with sufficient processing intelligence, FIG. 7 shows a robotic cleaning device 100 according to an embodiment of the present invention in a bottom view, i.e. the bottom side of the robotic cleaning device is shown. The arrow indicates the forward direction of the robotic cleaning device 100 being illustrated in the form of a robotic vacuum cleaner.

The robotic cleaning device 100 comprises a main body 111 housing components such as a propulsion system comprising driving means in the form of two electric wheel motors 115a, 115b for enabling movement of the driving wheels 112, 113 such that the cleaning device can be moved over a surface to be cleaned. Each wheel motor 115a, 115b is capable of controlling the respective driving wheel 112, 113 to rotate independently of each other in order to move the robotic cleaning device 100 across the surface to be cleaned. A number of different driving wheel arrangements, as well as various wheel motor arrangements, can be envisaged. It should be noted that the robotic cleaning device may have any appropriate shape, such as a device having a more traditional circular-shaped main body, or a triangular-shaped main body. As an alternative, a track propulsion system may be used or even a hovercraft propulsion system. The propulsion system may further be arranged to cause the robotic cleaning device 100 to perform any one or more of a yaw, pitch, translation or roll movement.

A controller 116 such as a microprocessor controls the wheel motors 115a, 115b to rotate the driving wheels 112, 113 as required in view of information received from an obstacle detecting device (not shown in FIG. 7) for detecting obstacles in the form of walls, floor lamps, table legs, around which the robotic cleaning device must navigate. The obstacle detecting device may be embodied in the form of a 3D sensor system registering its surroundings, implemented by means of e.g. a 3D camera, a camera in combination with lasers, a laser scanner, etc. for detecting obstacles and communicating information about any detected obstacle to the microprocessor 116. The microprocessor 116 communicates with the wheel motors 115a, 115b to control movement of the wheels 112, 113 in accordance with information provided by the obstacle detecting device such that the robotic cleaning device 100 can move as desired across the surface to be cleaned.

Further, the main body 111 may optionally be arranged with a cleaning member 117 for removing debris and dust from the surface to be cleaned in the form of a rotatable brush roll arranged in an opening 118 at the bottom of the robotic cleaner 100. Thus, the rotatable brush roll 117 is arranged along a horizontal axis in the opening 118 to enhance the dust and debris collecting properties of the robotic cleaning device 100. In order to rotate the brush roll 117, a brush roll motor 119 is operatively coupled to the brush roll to control its rotation in line with instructions received from the controller 116.

Moreover, the main body 111 of the robotic cleaner 100 comprises a suction fan 20 creating an air flow for transporting debris to a dust bag or cyclone arrangement (not shown) housed in the main body via the opening 118 in the bottom side of the main body 111. The suction fan 120 is driven by a fan motor 121 communicatively connected to the controller 116 from which the fan motor 121 receives instructions for controlling the suction fan 120. It should be noted that a robotic cleaning device having either one of the rotatable brush roll 117 and the suction fan 20 for transporting debris to the dust bag can be envisaged. A combination of the two will however enhance the debris-removing capabilities of the robotic cleaning device 100.

The main body 111 of the robotic cleaning device 100 may further equipped with an inertia measurement unit (IMU) 124, such as e.g. a gyroscope and/or an accelerometer and/or a magnetometer or any other appropriate device for measuring displacement of the robotic cleaning device 100 with respect to a reference position, in the form of e.g. orientation, rotational velocity, gravitational forces, etc. A three-axis gyroscope is capable of measuring rotational velocity in a roll, pitch and yaw movement of the robotic cleaning device 100. A three-axis accelerometer is capable of measuring acceleration in all directions, which is mainly used to determine whether the robotic cleaning device is bumped or lifted or if it is stuck (i.e. not moving even though the wheels are turning). The robotic cleaning device 100 further comprises encoders (not shown in FIG. 7) on each drive wheel 112, 113 which generate pulses when the wheels turn. The encoders may for instance be magnetic or optical. By counting the pulses at the controller 116, the speed of each wheel 112, 113 can be determined. By combining wheel speed readings with gyroscope information, the controller 116 can perform so called dead reckoning to determine position and heading of the cleaning device 100.

The main body 111 may further be arranged with a rotating side brush 114 adjacent to the opening 118, the rotation of which could be controlled by the drive motors 115a, 115b, the brush roll motor 119, or alternatively a separate side brush motor (not shown). Advantageously, the rotating side brush 114 sweeps debris and dust such from the surface to be cleaned such that the debris ends up under the main body 111 at the opening 118 and thus can be transported to a dust chamber of the robotic cleaning device. Further advantageous is that the reach of the robotic cleaning device 100 will be improved, and e.g. corners and areas where a floor meets a wall are much more effectively cleaned. As is illustrated in FIG. 7, the rotating side brush 114 rotates in a direction such that it sweeps debris towards the opening 118 such that the suction fan 20 can transport the debris to a dust chamber. The robotic cleaning device 100 may comprise two rotating side brushes arranged laterally on each side of, and adjacent to, the opening 118.

With further reference to FIG. 7, the controller/processing unit 116 embodied in the form of one or more microprocessors is arranged to execute a computer program 125 downloaded to a suitable storage medium 126 associated with the microprocessor, such as a Random Access Memory (RAM), a Flash memory or a hard disk drive. The controller 116 is arranged to carry out a method according to embodiments of the present invention when the appropriate computer program 125 comprising computer-executable instructions is downloaded to the storage medium 126 and executed by the controller 116. The storage medium 126 may also be a computer program product comprising the computer program 125. Alternatively, the computer program 125 may be transferred to the storage medium 126 by means of a suitable computer program product, such as a digital versatile disc (DVD), compact disc (CD) or a memory stick. As a further alternative, the computer program 125 may be downloaded to the storage medium 126 over a wired or wireless network. The controller 116 may alternatively be embodied in the form of a digital signal processor (DSP), an application specific integrated circuit (ASIC), a field-programmable gate array (FPGA), a complex programmable logic device (CPLD), etc.

As has been mentioned, by measuring a difference in level of the surface in front of the robotic device 100, it is advantageously possible to timely plan how the robotic device 100 should move for performing a cleaning programme.

Figure 8:
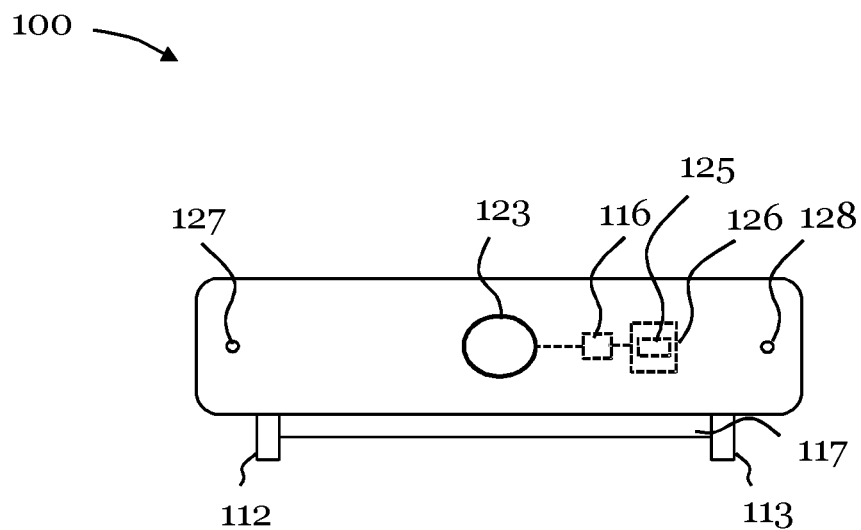
FIG. 8 shows a front view of a robotic cleaning device according to an embodiment.

With reference to FIG. 7, by detecting height of objects or surfaces in front of the robotic cleaning device 100, for instance a thick rug, the robot 100 may be controlled to move along the periphery of the rug thereby making efficient use of the side brush 114. After having cleaned along the periphery of the rug, the robotic cleaning device 100 may move up onto the rug, where it typically would refrain from using the side brush 114. Instead, the robot 100 could alternately rotate the rotatable brush roll 117 in a forward and backward direction to avoid having the fibers of the rug being entangled in the brush roll 117. Hence, the movement of the brush roll 117 and any side brush(es) 114 can advantageously be controlled by taking into account the determined height of the surfaces and objects in front of the robotic cleaning device 100. FIG. 8 shows a front view of the robotic cleaning device 100 of FIG. 7 in an embodiment of the present invention illustrating the previously mentioned obstacle detecting device in the form of a 3D sensor system comprising at least a camera 123 and a first and a second line laser 127, 128, which may be horizontally or vertically oriented line lasers. Further shown is the controller 116, the main body 111, the driving wheels 112, 113, and the rotatable brush roll 117 previously discussed with reference to FIG. 6. The controller 116 is operatively coupled to the camera 123 for recording images of a vicinity of the robotic cleaning device 100. The first and second line lasers 127, 128 may preferably be vertical line lasers and are arranged lateral of the camera 123 and configured to illuminate a height and a width that is greater than the height and width of the robotic cleaning device 100. Further, the angle of the field of view of the camera 123 is preferably smaller than the space illuminated by the first and second line lasers 127, 128. The camera 123 is controlled by the controller 116 to capture and record a plurality of images per second. Data from the images is extracted by the controller 116 and the data is typically saved in the memory 126 along with the computer program 125.

The first and second line lasers 127, 128 are typically arranged on a respective side of the camera 123 along an axis being perpendicular to an optical axis of the camera. Further, the line lasers 127, 128 are directed such that their respective laser beams intersect within the field of view of the camera 123. Typically, the intersection coincides with the optical axis of the camera 123.

The first and second line laser 127, 128 are configured to scan, preferably in a vertical orientation, the vicinity of the robotic cleaning device 100, normally in the direction of movement of the robotic cleaning device 100. The first and second line lasers 127, 128 are configured to send out laser beams, which illuminate furniture, walls and other objects of e.g. a room to be cleaned. The camera 123 is controlled by the controller 116 to capture and record images from which the controller 116 creates a representation or layout of the surroundings that the robotic cleaning device 100 is operating in, by extracting features from the images and by measuring the distance covered by the robotic cleaning device 100, while the robotic cleaning device 100 is moving across the surface to be cleaned. Thus, the controller 116 derives positional data of the robotic cleaning device 100 with respect to the surface to be cleaned from the recorded images, generates a 3D representation of the surroundings from the derived positional data and controls the driving motors 115a, 115b to move the robotic cleaning device across the surface to be cleaned in accordance with the generated 3D representation and navigation information supplied to the robotic cleaning device 100 such that the surface to be cleaned can be navigated by taking into account the generated 3D representation. Since the derived positional data will serve as a foundation for the navigation of the robotic cleaning device, it is important that the positioning is correct; the robotic device will otherwise navigate according to a "map" of its surroundings that is misleading.

The 3D representation generated from the images recorded by the 3D sensor system thus facilitates detection of obstacles in the form of walls, floor lamps, table legs, around which the robotic cleaning device must navigate as well as rugs, carpets, doorsteps, etc., that the robotic cleaning device 100 must traverse. The robotic cleaning device 100 is hence configured to learn about its environment or surroundings by operating/cleaning.

Hence, the 3D sensor system comprising the camera 123 and the first and second vertical line lasers 127, 128 is arranged to record images of a vicinity of the robotic cleaning from which objects/obstacles may be detected. The controller 116 is capable of positioning the robotic cleaning device 100 with respect to the detected obstacles and hence a surface to be cleaned by deriving positional data from the recorded images. From the positioning, the controller 116 controls movement of the robotic cleaning device 100 by means of controlling the wheels 112, 113 via the wheel drive motors 115a, 115b, across the surface to be cleaned.

The derived positional data facilitates control of the movement of the robotic cleaning device 100 such that cleaning device can be navigated to move very close to an object, and to move closely around the object to remove debris from the surface on which the object is located. Hence, the derived positional data is utilized to move flush against the object, being e.g. a chair, a table, a sofa, a thick rug or a wall. Typically, the controller 116 continuously generates and transfers control signals to the drive wheels 112, 113 via the drive motors 115a, 115b such that the robotic cleaning device 100 is navigated close to the object.

It should further be noted that while the embodiments of the invention has been discussed in the context of using a camera and one or two line lasers for illuminating a surface over which the robotic cleaning device 100 moves, it would further be possible to use known 3D sensors utilizing time of flight measurements of an image being completely illuminated. With such a time of flight 3D sensor, the distance in a captured image would be determined for each pixel and distances to detected objects may be determined in line with the above.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for a robotic cleaning device of detecting a difference in level of a surface in front of the robotic cleaning device, the method comprising:
    illuminating the surface with a line laser;
    capturing an image of the surface;
    detecting a luminous section in the captured image caused by the line laser;
    identifying at least a first segment of the line laser and a second segment of the line laser representing the detected luminous section, the first segment of the line laser and the second segment of the line laser separated by a discontinuity due to the difference in level of the surface; and
    determining, from coordinates of the captured image, a vertical distance between the identified first segment of the line laser and second segment of the line laser, the vertical distance constituting a height of the detected difference in level of the surface.

2. The method of claim 1,
    wherein the difference in level is detected to comprise a ledge.

3. The method of claim 1, wherein the detecting of the difference in level of the surface from a positional relationship between the identified first and second segment of the line laser comprises:
    detecting a third segment linking the identified first and second segment of the line laser in the captured image, wherein the difference in level is detected to comprise an elevation.

4. The method of claim 2, wherein the detecting of the difference in level of the surface from a positional relationship between the identified first and second segment of the line laser comprises:
    detecting that the identified second segment of the line laser is located vertically below the identified first segment of the line laser in the captured image, wherein the difference in level is detected to comprise a ledge.

5. The method of claim 3, wherein the detecting of the difference in level of the surface from a positional relationship between the identified first and second segment of the line laser comprises:

detecting that the identified second segment of the line laser is located vertically above the identified first segment of the line laser in the captured image, wherein the difference in level is detected to comprise an elevation.

6. The method of claim 1, wherein the detecting of the difference in level of the surface from a positional relationship between the identified first and second segment of the line laser comprises:

determining, from coordinates of the captured image, a distance to a proximal end of the identified first segment of the line laser.

7. A robotic cleaning device configured to detect a difference in level of a surface in front of the robotic cleaning device, comprising:

a propulsion system configured to move the robotic cleaning device;

a camera device configured to record images of a vicinity of the robotic cleaning device;

at least one light source including a line laser configured to illuminate a surface in front of the robotic cleaning device; and a controller configured to:

control the line laser to illuminate a surface in front of the robotic cleaning device;

control the camera device to capture an image of the illuminated surface;

detect a luminous section in the captured image caused by the line laser illuminating the surface;

identify at least a first segment of the line laser and a second segment of the line laser representing the detected luminous section, the first segment of the line laser and the second segment of the line laser separated by a discontinuity due to the difference in level of the surface; and determine from coordinates of the captured image, a vertical distance between the identified first segment of the line laser and second segment of the line laser, the vertical distance constituting a height of the detected difference in level of the surface.

8. The robotic cleaning device of claim 7, wherein the difference in level is detected to comprise a ledge.

9. The robotic cleaning device of claim 7, the controller further being configured to, when detecting the difference in level of the surface from a positional relationship between the identified first and second segment of the line laser:

detect a third segment linking the identified first and second segment of the line laser in the captured image, wherein the difference in level is detected to comprise an elevation.

10. The robotic cleaning device of claim 8, the controller further being configured to, when detecting the difference in level of the surface from a positional relationship between the identified first and second segment of the line laser:

detect that the identified second segment of the line laser is located vertically below the identified first segment of the line laser in the captured image, wherein the difference in level is detected to comprise a ledge.

11. The robotic cleaning device of claim 9, the controller further being configured to, when detecting the difference in level of the surface from a positional relationship between the identified first and second segment of the line laser:

detect that the identified second segment of the line laser is located vertically above the identified first segment of the line laser in the captured image, wherein the difference in level is detected to comprise an elevation.

12. The robotic cleaning device of claim 7, the controller further being configured to, when detecting the difference in level of the surface from a positional relationship between the identified first and second segment of the line laser:

determine, from coordinates of the captured image, a distance to a proximal end of the identified first segment of the line laser.

13. A non-transitory computer readable medium comprising computer-executable instructions stored thereon that when executed by a controller of a robotic cleaning device controls the robotic cleaning device to:

illuminate the surface with a line laser;

capture an image of the surface;

detect a luminous section in the captured image caused by the line laser;

identify at least a first segment of the line laser and a second segment of the line laser representing the detected luminous section, the first segment of the line laser and the second segment of the line laser separated by a discontinuity due to the difference in level of the surface; and determine, from coordinates of the captured image, a vertical distance between the identified first segment of the line laser and second segment of the line laser, the vertical distance constituting a height of the detected difference in level of the surface.

\* \* \* \* \*